United States Patent
Torigoe et al.

(10) Patent No.: US 11,757,699 B2
(45) Date of Patent: Sep. 12, 2023

(54) MULTI-AGENT SIMULATION SYSTEM AND METHOD

(71) Applicant: TOYOTA JIDOSHA KABUSHIKI KAISHA, Toyota (JP)

(72) Inventors: Takatomo Torigoe, Yokohama (JP); Akira Yoshioka, Tokyo-to (JP); Masahiro Kuwahara, Kasukabe (JP); Hiroaki Kimura, Tokyo-to (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/804,173

(22) Filed: May 26, 2022

(65) Prior Publication Data
US 2022/0393933 A1 Dec. 8, 2022

(30) Foreign Application Priority Data
Jun. 8, 2021 (JP) .................................. 2021-095952

(51) Int. Cl.
*H04L 41/046* (2022.01)
*H04L 67/51* (2022.01)

(52) U.S. Cl.
CPC ............ *H04L 41/046* (2013.01); *H04L 67/51* (2022.05)

(58) Field of Classification Search
None
See application file for complete search history.

(56) References Cited

U.S. PATENT DOCUMENTS

| | | | |
|---|---|---|---|
| 2005/0198040 A1* | 9/2005 | Cohen | H04L 12/2838 |
| 2010/0312542 A1* | 12/2010 | Van Wyk | G06F 8/10 |
| | | | 703/22 |
| 2012/0331035 A1* | 12/2012 | Pelletier | G05B 19/042 |
| | | | 709/202 |
| 2015/0085691 A1* | 3/2015 | Custer | H04L 43/10 |
| | | | 370/252 |
| 2019/0026408 A1 | 1/2019 | Yamaumi et al. | |
| 2019/0377842 A1 | 12/2019 | Yamane et al. | |
| 2022/0058012 A1* | 2/2022 | Kaushik | H04L 63/029 |

FOREIGN PATENT DOCUMENTS

| | | |
|---|---|---|
| JP | 2019021143 A | 2/2019 |
| JP | 2019212245 A | 12/2019 |
| WO | 2015132893 A1 | 9/2015 |

* cited by examiner

*Primary Examiner* — Younes Naji
(74) *Attorney, Agent, or Firm* — Dickinson Wright, PLLC

(57) ABSTRACT

The multi-agent simulation system includes a plurality of back-end servers provided for each of a plurality of service systems and a plurality of agent simulators provided for each of the plurality of agents. Each of the plurality of service systems provides a service used in the target world. The plurality of agent simulators are programmed to simulate a state of each of the plurality of agents while causing the plurality of agents to interact with each other by exchange of first messages. The plurality of back-end servers and the plurality of agent simulators are programmed to simultaneously simulate a plurality of services by exchanging second messages different from the first messages.

6 Claims, 9 Drawing Sheets

MULTI-AGENT SIMULATION SYSTEM AND METHOD

CROSS-REFERENCE TO RELATED APPLICATION

The present application claims priority under 35 U.S.C. § 119 to Japanese Patent Application No. 2021-095952, filed Jun. 8, 2021, the contents of which application are incorporated herein by reference in their entirety.

BACKGROUND

Field

The present disclosure relates to a multi-agent simulation system and a multi-agent simulation method for simulating a target world using a plurality of agents interacting with each other.

Background Art

Multi-agent simulation is known. The multi-agent simulation is to simulate a target world using a plurality of agents interacting with each other. For example, JP2019-021143A discloses a prior art related to human flow simulation, which is a multi-agent simulation system. In the prior art, as information for inducing an action of an agent, for example, information proposing movement to a facility, information on a priority ticket, information on a service ticket, a discount ticket, and a coupon, and other information that motivates movement are given to the agent.

As documents showing the state of the art as of the filing of the present application in the technical field of the present disclosure, JP2019-212245A and WO2015/132893 can be exemplified in addition to JP2019-021143A.

SUMMARY

Various services are provided and used in the real world. However, there is room for further study on multi-agent simulation in which the target world of simulation is a world where various services are provided and used.

The present disclosure has been made in view of the above-described problems. It is an object of the present disclosure to provide a multi-agent simulation system and method capable of simulating a world in which various services are provided and used using a plurality of agents.

The present disclosure provides a multi-agent simulation system that simulates a target world using a plurality of agents interacting with each other. The system of the present disclosure comprises a plurality of back-end servers provided for each of a plurality of service systems and a plurality of agent simulators provided for each of the plurality of agents. Each of the plurality of service systems provides a service used in the target world. The plurality of agent simulators are programmed to simulate a state of each of the plurality of agents while causing the plurality of agents to interact with each other by exchange of first messages. The plurality of back-end servers and the plurality of agent simulators are programmed to simultaneously simulate a plurality of services by exchanging second messages different from the first messages.

The plurality of agents include a plurality of first agents using the plurality of services and a plurality of second agents used to provide the plurality of services. The plurality of agent simulators include a plurality of first agent simulators and a plurality of second agent simulators. The plurality of first agent simulators are provided for each of the plurality of first agents and programmed to simulate a state of each of the plurality of first agents. The plurality of second agent simulators are provided for each of the plurality of second agents and programmed to simulate a state of each of the plurality of second agents.

In the system of the present disclosure, the second messages include a message transmitted from each of the plurality of first agent simulators and including information on a use state of service by each of the plurality of first agents. The second messages also include a message transmitted from each of the plurality of back-end servers and including information on a provision state of service to each of the plurality of first agents. The second messages also include a message transmitted from each of the plurality of second agent simulators and including information on an operation state of each of the plurality of second agents. The second messages also include a message transmitted from each of the plurality of back-end servers and including information on an operation instruction to each of the plurality of second agents.

The system of the present disclosure may further comprise a center controller programmed to communicate with the plurality of agent simulators to control transmission and reception of the first messages between the plurality of agent simulators. In this case, the plurality of agent simulators may be programmed to exchange the first messages between the plurality of agent simulators via the center controller and exchange the second messages with the plurality of back-end servers directly without going through the center controller. Also, in the system of the present disclosure, each of the plurality of first agent simulators may comprise a client simulator programmed to simulate a behavior of a first agent as a client of the plurality of services. Furthermore, in the system of the present disclosure, the plurality of back-end servers may be programmed to exchange messages for linking the plurality of services.

The present disclosure provides a multi-agent simulation method for simulating a target world using a plurality of agents interacting with each other. The method of the present disclosure comprises exchanging first messages between a plurality of agent simulators provided for each of the plurality of agents, and simulating a state of each of the plurality of agents while causing the plurality of agents to interact with each other by exchange of the first messages. The method of the present disclosure also comprises exchanging second messages different from the first messages between the plurality of agent simulators and a plurality of back-end servers provided for each of a plurality of service systems, the each of a plurality of service systems providing a service used in the target world, and simultaneously simulating a plurality of services by exchange of the second messages.

The plurality of agents include a plurality of first agents using the plurality of services and a plurality of second agents used to provide the plurality of services. The plurality of agent simulators include a plurality of first agent simulators provided for each of the plurality of first agents and a plurality of second agent simulators provided for each of the plurality of second agents. The method of the present disclosure comprises simulating a state of each of the plurality of first agents by the plurality of first agent simulators and simulating a state of each of the plurality of second agents by the plurality of second agent simulators.

In the method of the present disclosure, the second messages include a message transmitted from each of the plurality of first agent simulators and including information on a use state of service by each of the plurality of first agents. The second messages also include a message transmitted from each of the plurality of back-end servers and including information on a provision state of service to each of the plurality of first agents. The second messages also include a message transmitted from each of the plurality of second agent simulators and including information on an operation state of each of the plurality of second agents. Furthermore, the second messages also include a message transmitted from each of the plurality of back-end servers and including information on an operation instruction to each of the plurality of second agents.

In the method of the present disclosure, the exchanging the first messages may include exchanging the first messages between the plurality of agent simulators via a center controller programmed to communicate with the plurality of agent simulators, and the exchanging the second messages may include exchanging the second messages between the plurality of agent simulators and the plurality of back-end servers directly without going through the center controller. The method of the present disclosure may further comprise simulating a behavior of a first agent as a client of the plurality of services by a client simulator provided for each of the plurality of first agent simulators. The method of the present disclosure may further comprise exchanging messages for linking the plurality of services by the plurality of back-end servers.

In the multi-agent simulation system and method of the present disclosure, the plurality of back-end servers provided for each of the plurality of service systems are used as they are. The plurality of back-end servers exchange the second messages with the plurality of agent simulators, the second messages being different from the first messages exchanged between the plurality of agent simulators to simulate the state of each agent. According to the multi-agent simulation system and method of the present disclosure, the exchange of the second messages between the plurality of back-end servers and the plurality of agent simulators make it possible to simultaneously simulate the plurality of services provided and used in the target world.

DETAILED DESCRIPTION

Hereunder, an embodiment of the present disclosure will be described with reference to the drawings. Note that when the numerals of numbers, quantities, amounts, ranges and the like of respective elements are mentioned in the embodiment shown as follows, the present disclosure is not limited to the mentioned numerals unless specially explicitly described otherwise, or unless the disclosure is explicitly designated by the numerals theoretically. Furthermore, structures and processes that are described in the embodiments shown as follows are not always indispensable to the disclosure unless specially explicitly shown otherwise, or unless the disclosure is explicitly designated by the structures or the processes theoretically.

1. Overview of Multi-Agent Simulation System

Figure 1:
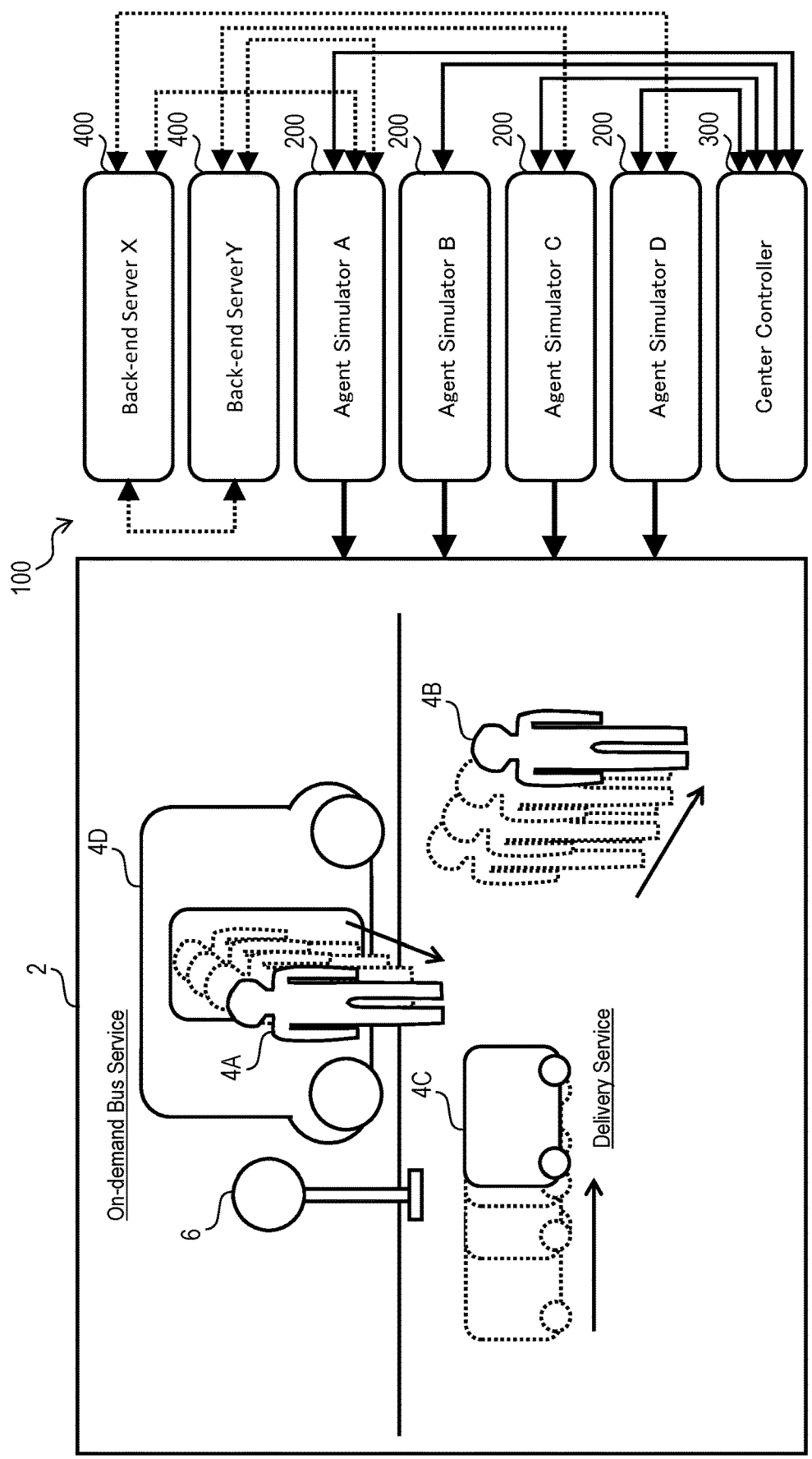
FIG. 1 is a diagram illustrating an overview of a multi-agent simulation system according to an embodiment of the present disclosure.
Figure 2:
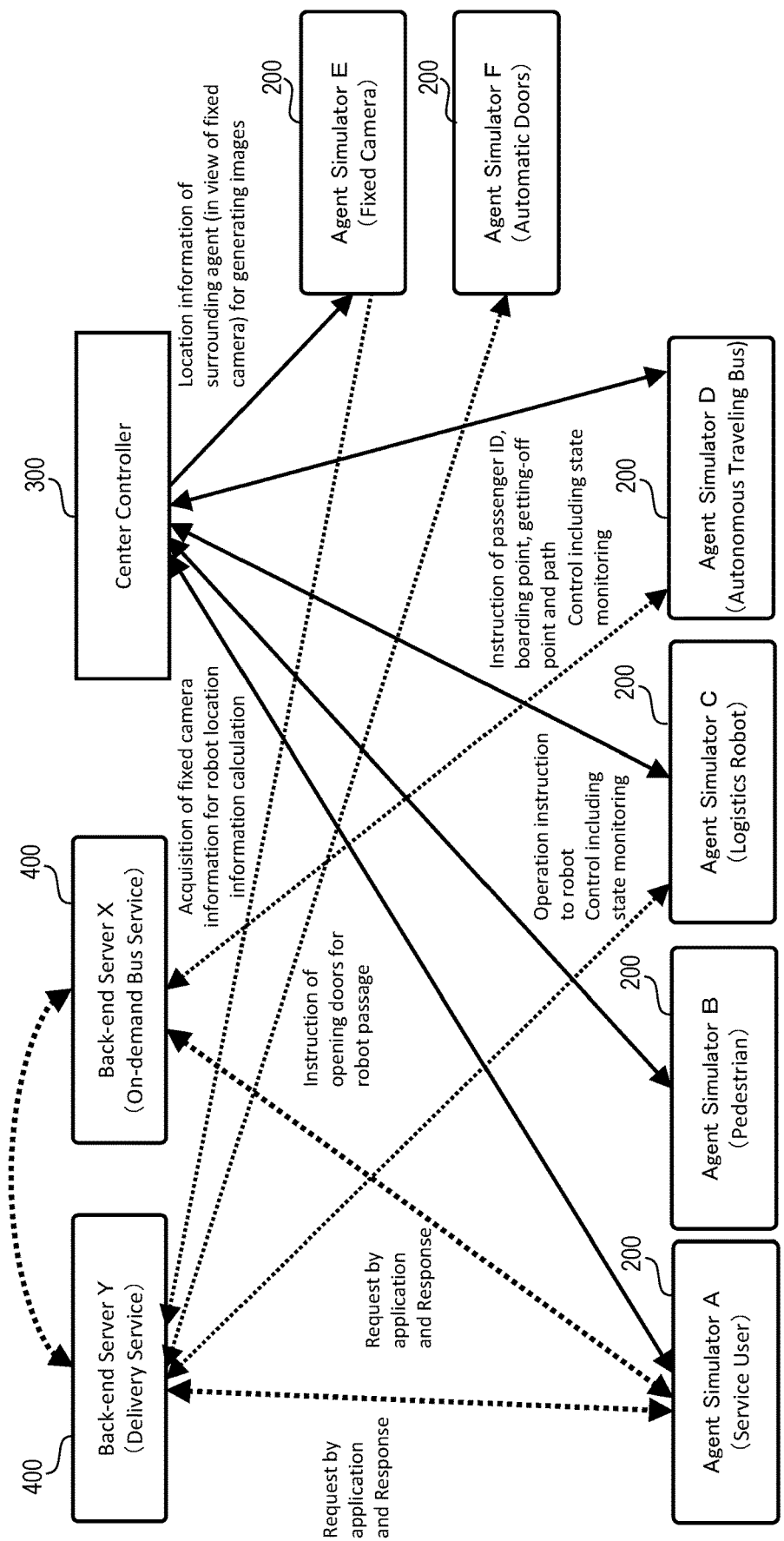
FIG. 2 is a diagram illustrating the overview of the multi-agent simulation system according to the embodiment of the present disclosure.

Referring to FIGS. 1 and 2, an overview of a multi-agent simulation system according to an embodiment of the present disclosure will be described. Hereafter, the multi-agent simulation system is abbreviated as the MAS system.

1-1. Overview of Configuration and Functions of MAS System

FIG. 1 shows a schematic configuration of the MAS system 100 of the present embodiment. The MAS system 100 simulates a world (simulation target world) 2 which is the target of simulation by causing a plurality of agents 4A, 4B, 4C, 4D to interact with each other. The simulation target world by the MAS system of the present disclosure is not limited. However, the simulation target world 2 of the MAS system 100 of the present embodiment is a world in which a person coexists with an autonomous mobile, for example, a robot or a vehicle and can receive various services using the autonomous mobile. The services provided in the simulation target world 2 include, for example, mobility services such as on-demand buses and ferry type buses using autonomous traveling vehicles, and logistics services for delivering packages using autonomous mobile robots.

The simulation target world 2 is comprised of a large number of and many types of agents. The agents comprising the simulation target world 2 include an agent representing a moving object and an agent representing a non-moving object. Examples of moving objects represented as agents are pedestrians, robots, low-speed mobiles, vehicles, pedestrians in which real people participate using VR systems, elevators, etc. Examples of non-moving objects represented as agents are sensors including a camera, automatic doors, etc.

However, in FIG. 1, only three agents 4A, 4B, 4C, 4D are shown in the simulation target world 2 for the purpose of illustration. Of these, the agents 4A,4B represent pedestrians, the agent 4C represents logistics robot, and the agent 4D represents autonomous traveling bus. In some cases, the agents 4A,4B are referred to as pedestrian agents 4A,4B, the agent 4C is referred to as a logistics robot agent 4C, and the agent 4D is referred to as an autonomous traveling bus agent 4D. In the following, the simulation target world 2, which is a virtual world, is called the virtual world 2 to distinguish it from the real world.

The MAS system 100 includes a plurality of agent simulators 200. The agent simulator 200 is provided for each agent 4A,4B,4C,4D. Hereinafter, when distinguishing each agent simulator 200, the agent simulator 200 that simulates the state of the pedestrian agent 4A is referred to as agent simulator A. Similarly, the agent simulator 200 that simulates the state of agents 4B, 4C, 4D is referred to as agent simulators B, C, D. Each agent simulator 200 has a different configuration depending on the type of the agent to be targeted. The configuration of the agent simulator 200 for each agent type will be described in detail later.

The agent simulator 200 simulates the state of each agent while causing agents to interact with each other by the exchange of messages. The messages exchanged between the agent simulators 200 contain movement information, which is information on the location and movement of the agent within the virtual world 2. The movement information includes information on the current state and the future plan for the location and movement of the agent. The Information on the current state is, for example, the location, direction, speed, and acceleration at the current time. The Information on the future plan is, for example, a list of locations, directions, speeds, and accelerations at future times. Hereinafter, messages relating to the location and movement of agents exchanged between the agent simulators 200 are referred to as movement messages.

The agent simulator 200 calculates the state of the target agent (ego-agent) to be simulated based on the states of surrounding agents. The surrounding agents are interactive agents that exist around the ego-agent and interact with the ego-agent. The information representing the states of the surrounding agent is movement messages. Each agent simulator 200 can grasp the states of the surrounding agents by exchanging movement messages with other agent simulators 200.

The MAS system 100 includes a center controller 300 that communicates with the agent simulators 200. In the MAS system 100, the exchange of movement messages between the agent simulators 200 is accomplished via the center controller 300. Flows of information indicated by solid lines between the agent simulators 200 and the center controller 300 indicate flows of movement messages.

In the example shown in FIG. 1, a movement message output from the agent simulator A is received by the center controller 300. The center controller 300 transmits the movement message of the agent simulator A to the agent simulators B, C, D. Similarly, a movement message of the agent simulator B is transmitted to the agent simulators A, C, D by the center controller 300. A movement message of the agent simulator C is transmitted to the agent simulators A, B, D by the center controller 300, and a movement message of the agent simulator D is transmitted to the agent simulators A, B, C by the center controller 300.

The MAS system 100 can simulate services provided in the virtual world 2. The services simulated in the MAS system 100 can include, for example, mobility services such as on-demand buses and ferry type buses using autonomous traveling vehicles, and logistics services for delivering packages using autonomous mobile robots. The service simulated by the MAS system 100 is typically a service that can be used by a user operating a service application in a user terminal.

In the example shown in FIG. 1, an on-demand bus service using the autonomous traveling bus agent 4D is provided to the pedestrian agent 4A. In the on-demand bus service, the autonomous traveling bus agent 4D is stopped at a boarding point designated by the operation of a service application by the pedestrian agent 4A, and the pedestrian agent 4A is boarded by the autonomous traveling bus agent 4D. Then, the autonomous traveling bus agent 4D is stopped at a getting-off point 6 designated by the operation of the service application by the pedestrian agent 4A, and the pedestrian agent 4A is gotten-off from the autonomous traveling bus agent 4D.

Further, In the example shown in FIG. 1, a delivery service using the logistics robot agent 4C is also provided to the pedestrian agent 4A. In the delivery service, the logistics robot agent 4C is made to wait in advance at the getting-off point 6 where the pedestrian agent 4A gets off from the autonomous traveling bus agent 4D. Then, when the autonomous traveling bus agent 4D arrives at the getting-off point 6, the logistics robot agent 4C receives a package from the pedestrian agent 4A and delivers the received package to the home of the pedestrian agent 4A.

Incidentally, in the example shown in FIG. 1, the pedestrian agent 4B is only a pedestrian. However, a delivery service may be provided in which the pedestrian agent 4B orders a pizza using a user terminal while walking, and another logistics robot agent delivers the pizza to the location where the pedestrian agent 4B is currently walking. In addition, in the virtual world 2, services similar to those in the real world, such as ticket sales and vehicle charging, may be provided in addition to services using autonomous mobiles.

The provision of services in the virtual world 2 is performed by a back-end server 400 for a service system. In the MAS system 100, the back-end server 400 is provided for each service system. The back-end server 400 is the same back-end server actually used in the real-world service system.

The MAS system 100 includes a plurality of back-end servers 400 for different service systems. In the example shown in FIG. 1, a back-end server 400 for providing an on-demand bus service and a back-end server 400 for providing a delivery service are provided. This makes it possible to simulate multiple kinds of services at the same time in the virtual world 2. When the back-end servers 400 are distinguished from each other, the back-end server 400 for a service system that provides the on-demand bus service is referred to as a back-end server X. The back-end server 400 for a service system that provides the delivery service is referred to as a back-end server Y.

The simulation of services by the MAS system 100 is accomplished by the exchange of service messages between the back-end servers 400 and the agent simulators 200. Flows of information indicated by dotted lines between the agent simulators 200 and the back-end servers 400 indicate flows of service messages. Each back-end server 400 exchanges service messages with the agent simulators 200 related to the provision of the service. In the example shown in FIG. 1, the back-end server X exchanges service messages with the agent simulators A and D, and the back-end server Y exchanges service messages with the agent simulators A and C.

The contents of the service messages exchanged depend on the type of agent that the agent simulator 200 is in charge of. The pedestrian agent 4A that the agent simulator A is in charge of is an agent that uses services provided by service systems using the back-end servers X, Y. The back-end servers X, Y receive service messages including service use information from the agent simulator A. The service usage information is information on the current state and the future plan on the utilization of the service system by the user, and includes a current usage state and input information by an application operation. The back-end servers X, Y transmit service messages including service provision state information to the agent simulator A. The service provision state information is information on the state of the user in the service system and is information provided through a service application of the user terminal.

The autonomous traveling bus agent 4D that the agent simulator D is in charge of is an agent used to provide services by the service system using the back-end server X. The logistics robot agent 4C that the agent simulator C is in charge of is an agent used to provide services by the service system using the back-end server Y. The back-end servers X, Y receive service messages including operation state information from the agent simulators C, D. The operation state information is information on the current state and the future plan of the logistics robot and the autonomous traveling bus. The information on the current state is, for example, status of mounted sensors, measured data, status of mounted actuators, and status on action determination. The information on the future plan is, for example, a list of future times, status of actuators, and status of action decisions. The back-end servers X, Y transmit service messages including operation instruction information to the agent simulators C, D. The operation instruction information is information that includes all or some of the future plan for providing services using an autonomous robot or autonomous vehicle. For example, the target points and paths that a logistics robot or autonomous traveling bus should move are included in the operation instruction information.

The MAS system 100 exchanges service messages between the plurality of back-end servers 400 under respective agreements. The service messages exchanged include, for example, the use states of services by the user and the provision states of services in each service. By exchanging service messages between the plurality of back-end servers 400, the services provided in the virtual world 2 can be linked to each other.

In the example shown in FIG. 1, service messages are exchanged between the back-end server X and the back-end server Y. By linking the on-demand bus service and the delivery service, it is possible, for example, to have the logistics robot agent 4C wait at the getting-off point 6 where the pedestrian agent 4A gets off from the autonomous traveling bus agent 4D. In addition, there is a case where the autonomous traveling bus agent 4D is delayed due to traffic congestion or the like, or a case where the pedestrian agent 4A is late for the scheduled autonomous traveling bus agent 4D. In such cases, by exchanging service messages between the back-end server X and the back-end server Y, the time for the logistics robot agent 4C to move to the getting-off point 6 can be adjusted to the predicted arrival time of the pedestrian agent 4A.

1-2. Specific Examples of Service Messages in MAS System

FIG. 2 illustrates specific examples of service messages exchanged in the virtual world 2 shown in FIG. 1. In FIG. 2, solid lines indicate flows of movement messages, and dotted lines indicate flows of service messages.

The agent simulators 200 shown in FIG. 2 include agent simulators E, F in addition to the agent simulators A, B, C, D. The agent that the agent simulator E is in charge of is a fixed camera. The agent that the agent simulator F is in charge of is an automatic door. The agents present in the virtual world 2 include non-moving objects such as roadside sensors including cameras and automatic doors.

Hereinafter, specific examples of contents of service messages in each service will be described.

In the on-demand bus service, a service request by the service application of the user terminal and the response thereto from the back-end server X are performed between the agent simulator A and the back-end server X. Between the agent simulator D and the back-end server X, a passenger ID, a boarding point, a getting-off point, and paths are instructed from the back-end server X to the agent simulator D. After that, the control of the autonomous traveling bus agent 4D including state monitoring by the back-end server X is performed.

In the delivery service, a service request by the service application of the user terminal and the response thereto from the back-end server Y are performed between the agent simulator A and the back-end server Y. Between the agent simulator C and the back-end server Y, an operation instruction to the logistics robot agent 4C is transmitted from the back-end server Y to the agent simulator C. After that, the control of the logistics robot agent 4C including state monitoring by the back-end server Y is performed. The back-end server Y instructs the agent simulator F to open the automatic door for the traffic of the logistics robot agent 4C. In addition, the back-end server Y obtains image information of the fixed camera necessary for calculating location information of the logistics robot agent 4C in the virtual world 2 from the agent simulator E. The agent simulator E receives location information of surrounding agents necessary for generating the image information from the center controller 300.

2. Overall Configuration and Information Flow of MAS System

Figure 3:
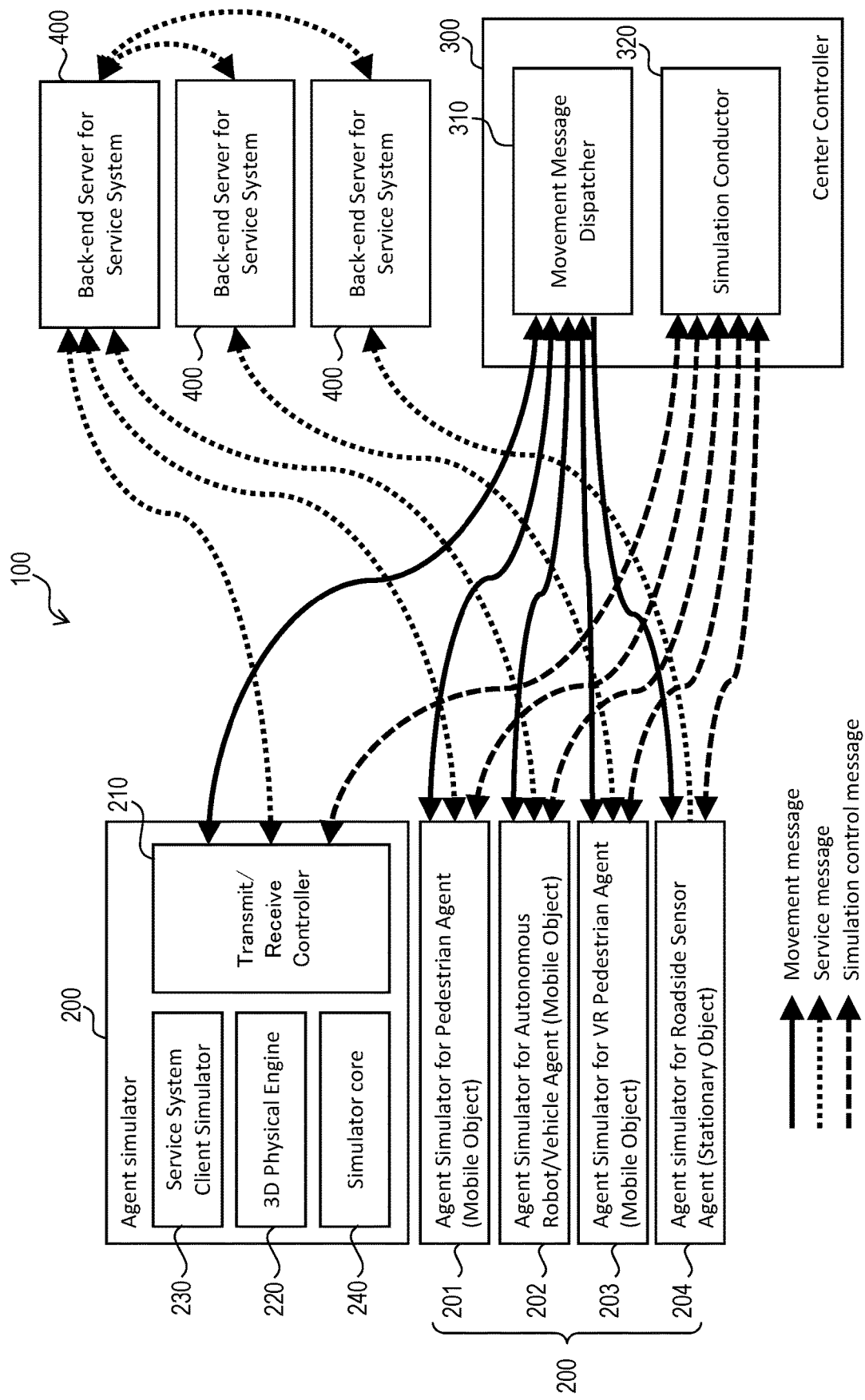
FIG. 3 is a block diagram illustrating a configuration of the multi-agent simulation system according to the embodiment of the present disclosure.

The overall configuration of the MAS system 100 and the flow of information will be described below with reference to FIG. 3. As shown in FIG. 3, the MAS system 100 includes a plurality of agent simulators 200, a center controller 300, and a back-end server 400 for a plurality of service systems. As will be described in detail later, these are distributed among a plurality of computers. That is, the MAS system 100 is a system based on parallel distributed processing by a plurality of computers.

The center controller 300 includes, as its function, a movement message dispatcher 310 and a simulation conductor 320. The center controller 300 is application software installed on the computer. The movement message dispatcher 310 and the simulation conductor 320 are programs that comprise the application software. The center controller 300 may share a computer that is hardware with one or more agent simulators 200, but preferably uses one computer exclusively.

The movement message dispatcher 310 relays the transmission and reception of movement messages between the agent simulators 200. The flow of information indicated by solid lines between the agent simulator 200 and the movement message dispatcher 310 indicates the flow of movement messages. The movement message dispatcher 310 is responsible for the exchange of the above-described movement messages provided by the center controller 300. The movement message dispatcher 310 communicates with all of the agent simulators 200 comprising the MAS system 100.

The simulation conductor 320 controls the simulation by the agent simulators 200 through the exchange of simulation control messages with the agent simulators 200. The flow of information indicated by dashed lines between the agent simulators 200 and the simulation conductor 320 indicates the flow of simulation control messages. The simulation conductor 320 communicates with all of the agent simulators 200 comprising the MAS system 100 to exchange simulation control messages. Unlike movement messages being exchanged between the plurality of agent simulators 200 via the movement message dispatcher 310, simulation control messages are exchanged separately between the simulation conductor 320 and the individual agent simulators 200. The exchange of simulation control messages is used for controlling, for example, simulation speed, stopping the simulation, pausing the simulation, restarting the simulation, and the time granularity of the simulation. The simulation speed is controlled as a whole MAS system 100, whereas stopping the simulation, pausing the simulation, restarting the simulation, and the time granularity of the simulation are controlled for each agent simulator 200.

The back-end servers 400 are the same back-end servers actually used in the real-world service systems. The MAS system 100 includes a plurality of back-end servers 400 for different service systems. The simulation of services is accomplished by the exchange of service messages between the back-end servers 400 and the agent simulators 200. However, unlike movement messages, service messages are exchanged directly without going through the center controller 300. Flows of information indicated by dotted lines between the agent simulators 200 and the back-end servers 400 and flows of information indicated by dotted lines between the back-end servers 400 indicate flows of service messages.

In the MAS system 100, by the exchange of service messages between the plurality of back-end servers 400 and the plurality of agent simulators 200, a plurality of services provided and used in the real world are simultaneously simulated. Further, since the exchange of service messages is performed directly without going through the center controller 300, the processing power of each back-end server 400 is reflected directly in the simulation. This enables the simultaneous simulation of services provided by multiple service systems with high accuracy.

There are a plurality of types of agent simulators 200 according to the types of agents that they are in charge of. For example, there are an agent simulator 201 for a pedestrian agent, an agent simulator 202 for an autonomous robot/vehicle agent, an agent simulator 203 for a VR pedestrian agent, and an agent simulator 204 for a roadside sensor agent. Hereafter, the agent simulator 200 is a general term for the plurality of types of agent simulators 201, 202, 203, 204.

The agent simulator 200 includes, as its function, a transmit/receive controller 210, a 3D physical engine 220, a service system client simulator 230, and a simulator core 240. The agent simulator 200 is application software installed on the computer. The transmit/receive controller 210, the 3D physical engine 220, the service system client simulator 230, and the simulator core 240 are programs that comprise the application software. These functions differ among the agent simulators 201, 202, 203, 204. Here, the functions that are generally common among the agent simulators 201, 202, 203, 204 will be described, and details of the functions of the agent simulators 201, 202, 203, 204 will be described later.

The transmit/receive controller 210 is an interface between the agent simulator 200 and other programs. The transmit/receive controller 210 receives movement messages from the movement message dispatcher 310 and transmits movement messages to the movement message dispatcher 310. However, in the agent simulator 204, only the reception of movement messages is performed. The transmit/receive controller 210 receives simulation control messages from the simulation conductor 320 and transmits simulation control messages to the simulation conductor 320. The transmit/receive controller 210 receives service messages from the back-end server 400 and transmits service messages to the back-end server 400. However, in the agent simulator 204, only the transmission of service messages is performed.

The 3D physical engine 220 estimates the current states of surrounding agents in three-dimensional space based on the movement messages received from other agent simulators 200. Estimation of the current state based on the previous states of the surrounding agents as described with reference to FIG. 3 is performed by the 3D physical engine 220. The 3D physical engine 220 generates peripheral information obtained by observation from the ego-agent based on the current states of the surrounding agents. The 3D physical engine 220 updates the state of the ego-agent in the three-dimensional space based on the simulation result by the simulator core 240 described later, and generates movement messages representing the state of the ego-agent. However, in the agent simulator 204, since the agent that the agent simulator 204 is in charge of is fixed, the state of the ego-agent is not updated and movement messages are not generated.

The service system client simulator 230 simulates the behavior of the ego-agent as a client of the service system associated with the back-end server 400. The service messages received by the transmit/receive controller 210 are input to the service system client simulator 230. The service messages generated by the service system client simulator 230 are transmitted from the transmit/receive controller 210. However, in the agent simulator 204, only the generation of service messages is performed.

The simulator core 240 simulates the state of the ego-agent in the next time step. The time interval of the time step for calculating the state of the ego-agent is the above-mentioned time granularity. The content of the simulation in the simulator core 240 differs for each type of agent simulator 200. Note that the agent simulator 204 does not have the simulator core 240 because the agent that the agent simulator 204 is in charge of is fixed and the simulation of the state of the ego-agent is unnecessary.

3. Detailed Configuration and Information Flow of Agent Simulator

Next, a detailed configuration and an information flow of the various agent simulators 201, 202, 203, 204 comprising the MAS system 100 will be described with reference to FIGS. 4 to 7. In FIGS. 4 to 7, the flow of information between blocks indicated by solid lines indicates the flow of movement messages. The flow of information between blocks indicated by dotted lines indicates the flow of service messages. The flow of information between blocks indicated by dashed lines indicates the flow of simulation control messages.

3-1. Agent Simulator for Pedestrian Agent

Figure 4:
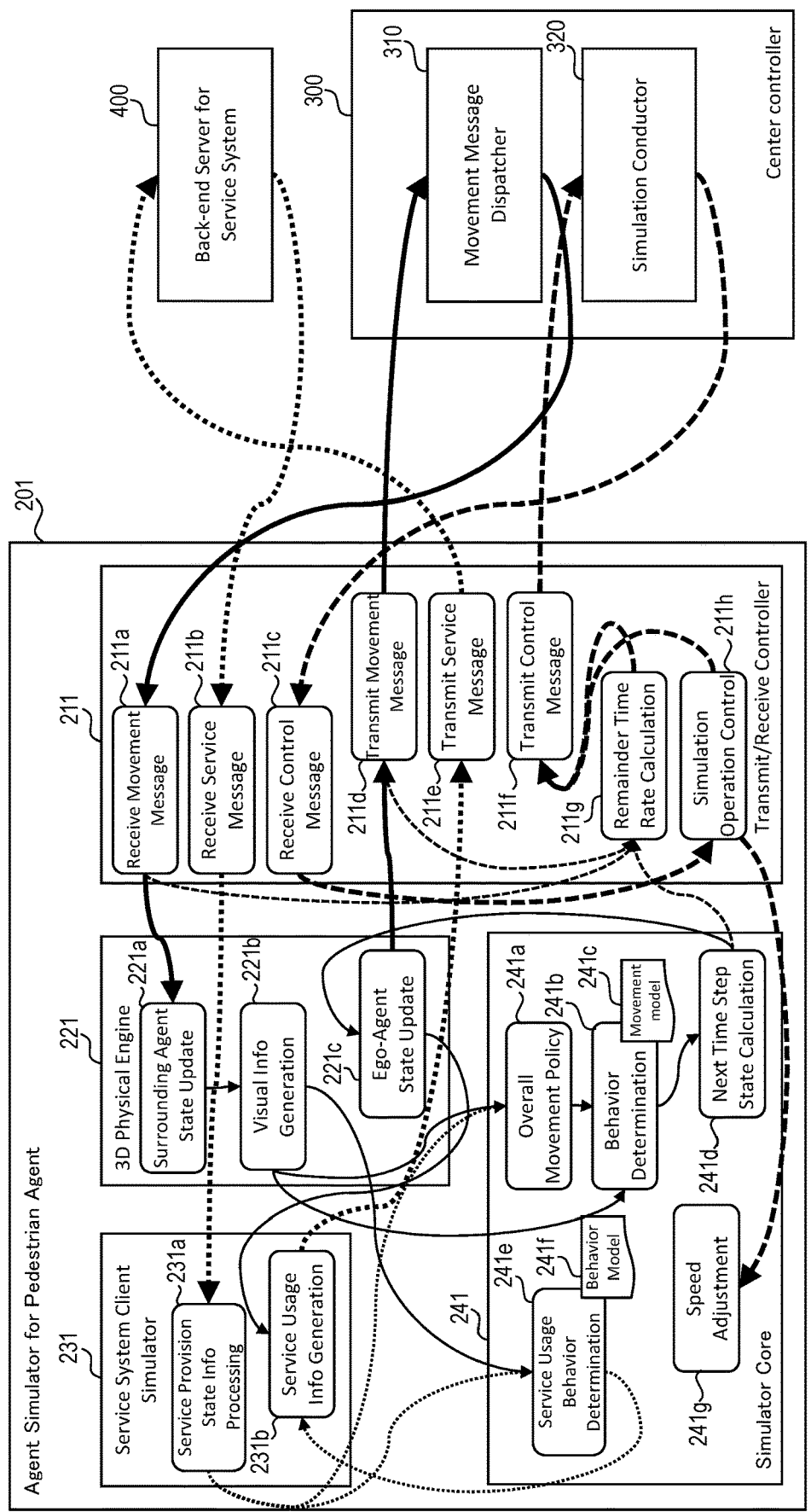
FIG. 4 is a block diagram illustrating a configuration and flows of information of an agent simulator for a pedestrian agent according to the embodiment of the present disclosure.

FIG. 4 is a block diagram illustrating a configuration and a flow of information of an agent simulator 201 for a pedestrian agent. Hereinafter, the overall configuration of the agent simulator 201 for the pedestrian agent, the details of each part, and the flow of information in the agent simulator 201 will be described below.

3-1-1. Overall Configuration of Agent Simulator for Pedestrian Agent

The agent simulator 201 includes, as its function, a transmit/receive controller 211, a 3D physical engine 221, a service system client simulator 231, and a simulator core 241. These functions are conceptually included in the transmit/receive controller 210, the 3D physical engine 220, the service system client simulator 230, and the simulator core 240, respectively.

The transmit/receive controller 211 includes a movement message receiving unit 211a, a service message receiving unit 211b, and a control message receiving unit 211c as functions for receiving various messages. The transmit/receive controller 211 includes a movement message transmitting unit 211d, a service message transmitting unit 211e, and a control message transmitting unit 211f as functions for transmitting various messages. The transmit/receive controller 211 further includes a remainder time rate calculating unit 211g and a simulation operation controlling unit 211h. Each of the units 211a to 211h comprising the transmit/receive controller 211 is a program or a part of a program. It should be noted that the description in each block describes a representative function of each unit and does not necessarily coincide with the name of each unit.

The 3D physical engine 221 includes, as its functions, a surrounding agent state updating unit 221a, a visual information generating unit 221b, and an ego-agent state updating unit 221c. Each of the units 221a, 221b, 221c comprising the 3D physical engine 221 is a program or a part of a program. It should be noted that the description in each block describes a representative function of each unit and does not necessarily coincide with the name of each unit.

The service system client simulator 231 includes, as its functions, a service provision state information processing unit 231a and a service usage information generating unit 231b. Each of the units 231a and 231b comprising the service system client simulator 231 is a program or a part of a program. It should be noted that the description in each block describes a representative function of each unit and does not necessarily coincide with the name of each unit.

The simulator core 241 includes, as its functions, an overall movement policy determining unit 241a, a behavior determining unit 241b, a next time step state calculating unit 241d, a service usage behavior determining unit 241e, and a speed adjusting unit 241g. Each of the units 241a, 241b, 241d, 241e, 241g comprising the simulator core 241 is a program or a part of a program. It should be noted that the description in each block describes a representative function of each unit and does not necessarily coincide with the name of each unit.

3-1-2. Details of Transmit/Receive Controller

In the transmit/receive controller 211, the movement message receiving unit 211a receives a movement message from the movement message dispatcher 310. The movement message receiving unit 211a outputs the received movement message to the surrounding agent state updating unit 221a of the 3D physical engine 221. In addition, the movement message receiving unit 211a outputs information including the time at which the movement message is received to the remainder time rate calculating unit 211g.

The service message receiving unit 211b receives a service message from the back-end server 400. The service message receiving unit 211b outputs the received service message to the service provision state information processing unit 231a of the service system client simulator 231.

The control message receiving unit 211c receives a simulation control message from the simulation conductor 320.

The control message receiving unit 211c outputs the received simulation control message to the simulation operation controlling unit 211h.

The movement message transmitting unit 211d acquires a movement message including the current state of the ego-agent from the ego-agent state updating unit 221c of the 3D physical engine 221. The movement message transmitting unit 211d transmits the acquired movement message to the movement message dispatcher 310. In addition, the movement message transmitting unit 211d transmits information including the transmission completion time of the movement message to the remainder time rate calculating unit 211g.

The service message transmitting unit 211e acquires a service message including service usage information from the service usage information generating unit 231b of the service system client simulator 231. The service message transmitting unit 211e transmits the acquired service message to the back-end server 400.

The control message transmitting unit 211f acquires a simulation control message including information on the speed state of the simulation from the remainder time rate calculating unit 211g. Also, the control message transmitting unit 211f acquires a simulation control message including the control state of the agent simulator 201 from the simulation operation controlling unit 211h. The control message transmitting unit 211f transmits the simulation control messages acquired from the remainder time rate calculating unit 211g and the simulation operation controlling unit 211h to the simulation conductor 320.

The remainder time rate calculating unit 211g acquires information including the reception time of the movement message from the movement message receiving unit 211a. In addition, the remainder time rate calculating unit 211g acquires information including the transmission completion time of the movement message from the movement message transmitting unit 211d. Further, the remainder time rate calculating unit 211g acquires the start time of calculation for updating the state of the ego-agent from the next time step state calculating unit 241d of the simulator core 241.

Here, Ta(N) is the start time of the calculation for updating the state of the ego-agent at this time step. Ta(N+1) is the start time of the calculation for updating the state of the ego-agent at the next time step. Te_last(N) is the reception time of the last received movement message among the movement messages of other agents necessary for the calculation to update the state of the ego-agent at the next time step. Te_first(N+1) is the reception time of the first received movement message among the movement messages of other agents necessary for the calculation to update the state of the ego-agent at the time step after the next time step. Td(N) is the transmission completion time of the movement message at the current time step.

The remainder time rate calculating unit 211g calculates a remainder time, a remainder time rate, and a delay time by the following equations.

$$\text{Remainder time} = Ta(N+1) - Te\_last(N)$$

$$\text{Remainder time rate} = (Ta(N+1) - Te\_last(N))/(Ta(N+1) - Ta(N))$$

$$\text{Delay time} = Td(N) - Te\_first(N+1)$$

The remainder time rate calculating unit 211g outputs a simulation control message including the remainder time, the remainder time rate, and the delay time to the control message transmitting unit 211f. The remainder time, the remainder time rate, and the delay time are information on the speed state of the simulation. The simulation conductor 320, which has received the simulation control message including the above information, determines control contents to be instructed to the agent simulator 201. The control contents to be instructed to the agent simulator 201 is, for example, simulation speed, stopping the simulation, pausing the simulation, and restarting the simulation. The simulation conductor 320 creates a simulation control message that includes the control contents to be instructed and transmits it to the agent simulator 201.

The simulation operation controlling unit 211h acquires a simulation control message from the control message receiving unit 211c. The simulation operation controlling unit 211h controls the simulation operation of the agent simulator 201 in accordance with an instruction included in the simulation control message. For example, when the change of the time granularity of the simulation is instructed, the simulation operation controlling unit 211h changes the time granularity of the simulation by the agent simulator 201 from the initial value to the instructed time granularity. The initial value of the time granularity is stored as a set value in the agent simulator 201. The upper and lower limit values of the time granularity are stored in the simulation conductor 320 for each type of agent.

When the instruction content of the simulation control message is the simulation speed, the simulation operation controlling unit 211h accelerates or decelerates the simulation speed by changing the operating frequency of the 3D physical engine 221 and the simulator cores 241. For example, for the simulator core 241, the instructed simulation speed is output to the speed adjusting unit 241g of the simulator core 241. The simulation speed means a speed ratio of the flow of time in the virtual world 2 to the flow of time in the real world. When the stop of the simulation is instructed, the simulation operation controlling unit 211h stops the simulation by the agent simulator 201. When the stop of the simulation is instructed, the simulation operation controlling unit 211h stops the simulation. When the restart of the simulation is instructed, the simulation operation controlling unit 211h restarts the simulation. The simulation operation controlling unit 211h outputs a simulation control message including the current control state of the agent simulator 201 to the control message transmitting unit 211f.

3-1-3. Details of 3D Physical Engine

In the 3D physical engine 221, the surrounding agent state updating unit 221a acquires a movement message from the movement message receiving unit 211a. The movement message acquired from the movement message receiving unit 211a is a movement message transmitted from another agent simulator via the movement message dispatcher 310. The surrounding agent state updating unit 221a estimates the current state of a surrounding agent existing around the ego-agent based on the acquired movement message.

When the current state of the surrounding agent is estimated from the past state, the surrounding agent state updating unit 221a uses the past state of the surrounding agent stored in the log. The method of estimating the current state using the past state of the surrounding agent is described using FIG. 3. The surrounding agent state updating unit 221a outputs the estimated current state of the surrounding agent to the visual information generating unit 221b and updates the log.

The visual information generating unit 221b acquires the current state of the surrounding agent from the surrounding agent state updating unit 221a. The visual information generating unit 221b generates peripheral information obtained by observation from the ego-agent based on the current state of the surrounding agent. Since the ego-agent is a pedestrian, peripheral information obtained by observation means visual information captured by the pedestrian's eyes. The visual information generating unit 221b outputs the generated visual information to the overall movement policy determining unit 241a, the behavior determining unit 241b, and the service usage behavior determining unit 241e of the simulator core 241.

The ego-agent state updating unit 221c acquires the state of the ego-agent in the next time step simulated by the simulator core 241 from the next time step state calculating unit 241d of the simulator core 241. The ego-agent state updating unit 221c updates the state of the ego-agent in the three-dimensional space based on the simulation result by the simulator core 241. The ego-agent state updating unit 221c outputs a movement message including the updated state of the ego-agent to the movement message transmitting unit 211d of the transmit/receive controller 211. The state of the ego-agent included in the movement message includes the location, direction, speed, acceleration in the current time step, and the location, direction, speed, and acceleration in the next time step. In addition, the ego-agent state updating unit 221c outputs information on the updated state of the ego-agent to the service usage information generating unit 231b of the service system client simulator 231.

3-1-4. Details of Service System Client Simulator

In the service system client simulator 231, the service provision state information processing unit 231a acquires a service message from the service message receiving unit 211b. The service message acquired from the service message receiving unit 211b includes service provision state information. The service provision state information processing unit 231a processes the service provision state information, and acquires information on the state of the ego-agent as a user of the service system and input items to the service application of the user terminal. The information on the state of the ego-agent as a user is information presented to the user terminal, and the input items are information requested to input in order for the ego-agent to use the service. The service provision state information processing unit 231a outputs the information on the state of the ego-agent as a user and the input items to the service application of the user terminal to the overall movement policy determining unit 241a and the service usage behavior determining unit 241e of the simulator core 241.

The service usage information generating unit 231b acquires the determination result of the service usage behavior of the ego-agent from the service usage behavior determining unit 241e of the simulator core 241. In addition, the service usage information generating unit 231b acquires the state of the ego-agent in the three-dimensional space from the ego-agent state updating unit 221c of the 3D physical engine 221. The service usage information generating unit 231b generates service usage information based on the acquired information and updates the usage state of the service of the ego-agent. The service usage information generating unit 231b outputs a service message including the service usage information to the service message transmitting unit 211e of the transmit/receive controller 211.

3-1-5. Details of Simulator Core

In the simulator core 241, the overall movement policy determining unit 241a acquires visual information from the visual information generating unit 221b of the 3D physical engine 221. In addition, the overall movement policy determining unit 241a acquires the information on the state of the ego-agent as a user and the input items to the service application of the user terminal from the service provision state information processing unit 231a of the service system client simulator 231. The overall movement policy determining unit 241a determines an overall movement policy of the ego-agent in the virtual world 2 based on the acquired information. The overall movement policy determining unit 241a outputs the determined overall movement policy to the behavior determining unit 241b.

The behavior determining unit 241b acquires the overall movement policy from the overall movement policy determining unit 241a, and acquires visual information from the visual information generating unit 221b of the 3D physical engine 221. The behavior determining unit 241b determines the behavior of the ego-agent by inputting the overall movement policy and the visual information to a movement model 241c. The movement model 241c is a simulation model modeling how a pedestrian moves in accordance with surrounding conditions appearing in the eyes of the pedestrian under a certain movement policy. The behavior determining unit 241b outputs the determined behavior of the ego-agent to the next time step state calculating unit 241d.

The next time step state calculating unit 241d acquires the behavior of the ego-agent determined by the behavior determining unit 241b. The next time step state calculating unit 241d calculates the state of the ego-agent in the next time step based on the behavior of the ego-agent. The calculated state of the ego-agent includes the location, direction, speed, and acceleration of the ego-agent in the next time step. The next time step state calculating unit 241d outputs the calculated state of the ego-agent in the next time step to the ego-agent state updating unit 221c of the 3D physical engine 221. The next time step state calculating unit 241d outputs the start time of calculation for updating the state of the ego-agent to the remainder time rate calculating unit 211g of the transmit/receive controller 211.

The service usage behavior determining unit 241e acquires the visual information from the visual information generating unit 221b of the 3D physical engine 221. In addition, the service usage behavior determining unit 241e acquires the information on the state of the ego-agent as a user and the input items to the service application of the user terminal from the service provision state information processing unit 231a of the service system client simulator 231. The service usage behavior determining unit 241e inputs the acquired information to a behavior model 241f to determine the behavior of the ego-agent as a user of the service system (service usage behavior). The behavior model 241f is a simulation model that models how a user behaves in accordance with surrounding conditions appearing in the eyes of the user when information on the service is presented to the user and input to the service application of the user terminal is requested. The service usage behavior determining unit 241e outputs the determined service usage behavior to the service usage information generating unit 231b.

The speed adjusting unit 241g acquires the simulation speed from the simulation operation controlling unit 211h. The simulation speed acquired from the simulation operation controlling unit 211h is the simulation speed instructed by the simulation conductor 320. The speed adjusting unit 241g accelerates or decelerates the simulation speed of the ego-agent by the simulator core 241 in accordance with an instruction from the simulation conductor 320.

3-2. Agent Simulator for Autonomous Robot/Vehicle Agent

Figure 5:
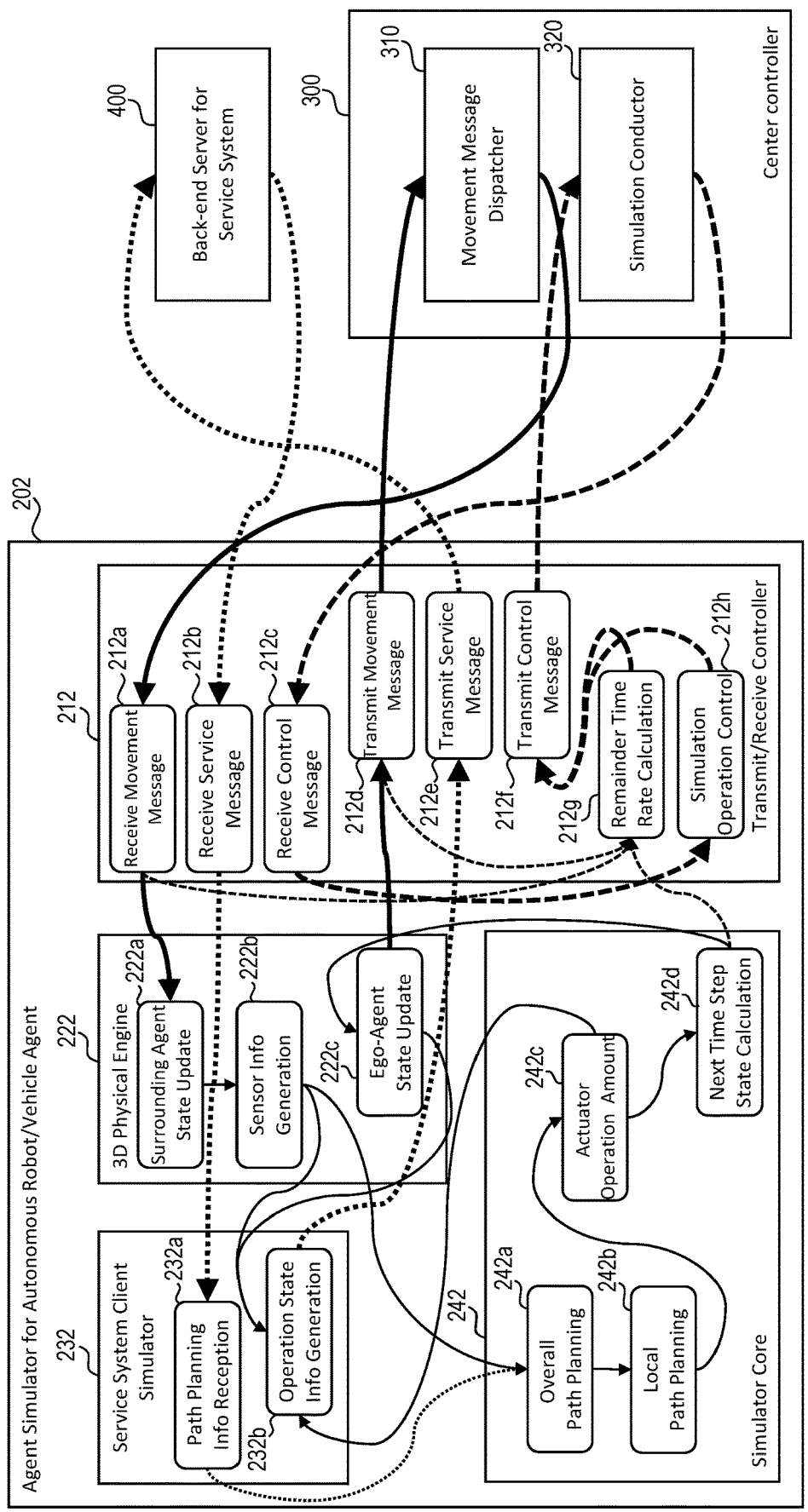
FIG. 5 is a block diagram illustrating a configuration and flows of information of an agent simulator for an autonomous mobile agent according to the embodiment of the present disclosure.

FIG. 5 is a block diagram illustrating a configuration and a flow of information of an agent simulator 202 for an autonomous robot/vehicle agent. The autonomous robot/vehicle agent is an agent for autonomous robot or autonomous vehicle used to provide services in the service system to which the back-end server 400 relates. Hereinafter, the overall configuration of the agent simulator 202 for the autonomous robot/vehicle agent, the details of each part, and the flow of information in the agent simulator 202 will be described below.

3-2-1. Overall Configuration of Agent Simulator for Autonomous Robot/Vehicle Agent The agent simulator 202 includes, as its function, a transmit/receive controller 212, a 3D physical engine 222, a service system client simulator 232, and a simulator core 242. These functions are conceptually included in the transmit/receive controller 210, the 3D physical engine 220, the service system client simulator 230, and the simulator core 240, respectively.

The transmit/receive controller 212 includes a movement message receiving unit 212a, a service message receiving unit 212b, and a control message receiving unit 212c as functions for receiving various messages. The transmit/receive controller 212 includes a movement message transmitting unit 212d, a service message transmitting unit 212e, and a control message transmitting unit 212f as functions for transmitting various messages. The transmit/receive controller 212 further includes a remainder time rate calculating unit 212g and a simulation operation controlling unit 212h. Each of the units 212a to 212h comprising the transmit/receive controller 211 is a program or a part of a program. It should be noted that the description in each block describes a representative function of each unit and does not necessarily coincide with the name of each unit.

The 3D physical engine 222 includes, as its functions, a surrounding agent state updating unit 222a, a sensor information generating unit 222b, and an ego-agent state updating unit 222c. Each of the units 222a, 222b, 222c comprising the 3D physical engine 222 is a program or a part of a program. It should be noted that the description in each block describes a representative function of each unit and does not necessarily coincide with the name of each unit.

The service system client simulator 232 includes, as its functions, a path planning information receiving unit 232a and an operation state information generating unit 232b. Each of the units 232a and 232b comprising the service system client simulator 232 is a program or a part of a program. It should be noted that the description in each block describes a representative function of each unit and does not necessarily coincide with the name of each unit.

The simulator core 242 includes, as its functions, an overall path planning unit 242a, a local path planning unit 242b, an actuator operation amount determining unit 242c, and a next time step state calculating unit 242d. Each of the units 242a, 242b, 242c, 242d comprising the simulator core 242 is a program or a part of a program. It should be noted that the description in each block describes a representative function of each unit and does not necessarily coincide with the name of each unit.

3-2-2. Details of Transmit/Receive Controller

In the transmit/receive controller 212, the movement message receiving unit 212a receives a movement message from the movement message dispatcher 310. The movement message receiving unit 212a outputs the received movement message to the surrounding agent state updating unit 222a of the 3D physical engine 222. In addition, the movement message receiving unit 212a outputs information including the time at which the movement message is received to the remainder time rate calculating unit 212g.

The service message receiving unit 212b receives a service message from the back-end server 400. The service message receiving unit 212b outputs the received service message to the path planning information receiving unit 232a of the service system client simulator 232.

The control message receiving unit 212c receives a simulation control message from the simulation conductor 320. The control message receiving unit 212c outputs the received simulation control message to the simulation operation controlling unit 212h.

The movement message transmitting unit 212d acquires a movement message including the current state of the ego-agent from the ego-agent state updating unit 222c of the 3D physical engine 222. The movement message transmitting unit 212d transmits the acquired movement message to the movement message dispatcher 310. In addition, the movement message transmitting unit 212d transmits information including the transmission completion time of the movement message to the remainder time rate calculating unit 212g.

The service message transmitting unit 212e acquires a service message including operation state information from the operation state information generating unit 232b of the service system client simulator 232. The service message transmitting unit 212e transmits the acquired service message to the back-end server 400.

The control message transmitting unit 212f acquires a simulation control message including information on the speed state of the simulation from the remainder time rate calculating unit 212g. Also, the control message transmitting unit 212f acquires a simulation control message including the control state of the agent simulator 202 from the simulation operation controlling unit 212h. The control message transmitting unit 212f transmits the simulation control messages acquired from the remainder time rate calculating unit 212g and the simulation operation controlling unit 212h to the simulation conductor 320.

The remainder time rate calculating unit 212g acquires information including the reception time of the movement message from the movement message receiving unit 212a. In addition, the remainder time rate calculating unit 212g acquires information including the transmission completion time of the movement message from the movement message transmitting unit 212d. Further, the remainder time rate calculating unit 212g acquires the start time of calculation for updating the state of the ego-agent from the next time step state calculating unit 242d of the simulator core 242.

The remainder time rate calculating unit 212g calculates the remainder time, the remainder time rate, and the delay time based on the acquired information by the above-described equations. The remainder time rate calculating unit 212g outputs a simulation control message including the remainder time, the remainder time rate, and the delay time to the control message transmitting unit 212f. Upon receiving the simulation control message including the above information, the simulation conductor 320 creates a simulation control message including control contents to be instructed to the agent simulator 202 and transmits the simulation control message to the agent simulator 202.

The simulation operation controlling unit 212h acquires a simulation control message from the control message receiving unit 212c. The simulation operation controlling unit 212h controls the simulation operation of the agent simulator 202 in accordance with an instruction included in the simulation control message. For example, when the change of the time granularity of the simulation is instructed, the simulation operation controlling unit 212h changes the time granularity of the simulation by the agent simulator 202 from the initial value to the instructed time granularity. The initial value of the time granularity is stored as a set value in the agent simulator 202. The upper and lower limit values of the time granularity are stored in the simulation conductor 320 for each type of agent.

When the instruction content of the simulation control message is the simulation speed, the simulation operation controlling unit 212h changes the operating frequency of the 3D physical engine 222 and the simulator cores 242 in accordance with the instructed simulation speed, and accelerates or decelerates the operation speed of the agent simulator 202. When the stop of the simulation is instructed, the simulation operation controlling unit 212h stops the simulation by the agent simulator 202. When the stop of the simulation is instructed, the simulation operation controlling unit 212h stops the simulation. When the restart of the simulation is instructed, the simulation operation controlling unit 212h restarts the simulation. The simulation operation controlling unit 212h outputs a simulation control message including the current control state of the agent simulator 202 to the control message transmitting unit 212f.

3-2-3. Details of 3D Physical Engine

In the 3D physical engine 222, the surrounding agent state updating unit 222a acquires a movement message from the movement message receiving unit 212a. The movement message acquired from the movement message receiving unit 212a is a movement message transmitted from another agent simulator via the movement message dispatcher 310. The surrounding agent state updating unit 222a estimates the current state of a surrounding agent existing around the ego-agent based on the acquired movement message.

When the current state of the surrounding agent is estimated from the past state, the surrounding agent state updating unit 222a uses the past state of the surrounding agent stored in the log. The method of estimating the current state using the past state of the surrounding agent is described using FIG. 3. The surrounding agent state updating unit 222a outputs the estimated current state of the surrounding agent to the sensor information generating unit 222b and updates the log.

The sensor information generating unit 222b acquires the current state of the surrounding agent from the surrounding agent state updating unit 222a. The sensor information generating unit 222b generates peripheral information obtained by observation from the ego-agent based on the current state of the surrounding agent. Since the ego-agent is an autonomous robot or an autonomous vehicle, peripheral information obtained by observation means sensor information captured by a sensor mounted on the autonomous robot or the autonomous vehicle. The sensor information generating unit 222b outputs the generated sensor information to the overall path planning unit 242a of the simulator core 242 and the operation state information generating unit 232b of the service system client simulator 232.

The ego-agent state updating unit 222c acquires the state of the ego-agent in the next time step calculated by the simulator core 242 from the next time step state calculating unit 242d of the simulator core 242. The ego-agent state updating unit 222c updates the state of the ego-agent in the three-dimensional space based on the calculation result by the simulator core 242. The ego-agent state updating unit 222c outputs a movement message including the updated state of the ego-agent to the movement message transmitting unit 212d of the transmit/receive controller 212. The state of the ego-agent included in the movement message includes the location, direction, speed, acceleration in the current time step, and the location, direction, speed, and acceleration in the next time step. In addition, the ego-agent state updating unit 222c outputs the updated information on the state of the ego-agent to the operation state information generating unit 232b of the service system client simulator 232.

3-2-4. Details of Service System Client Simulator

In the service system client simulator 232, the path planning information receiving unit 232a acquires a service message from the service message receiving unit 211b. The service message obtained from the service message receiving unit 212b includes operation instruction information for the service system to provide services using the autonomous robot/vehicle and information related to other service systems. The path planning information receiving unit 232a outputs the operation instruction information and the other service system information to the overall path planning unit 242a of the simulator core 242.

The operation state information generating unit 232b acquires the actuator operation amount in the next time step of the ego-agent from the actuator operation amount determining unit 242c of the simulator core 242. Also, the operation state information generating unit 232b acquires the sensor information from the sensor information generating unit 222b of the 3D physical engine 222, and acquires the state of the ego-agent in the three-dimensional space from the ego-agent state updating unit 222c. The operation state information generating unit 232b generates operation state information representing the operation state of the ego-agent related to the provision of the service based on the acquired information. The operation state information generating unit 232b outputs a service message including the operation state information to the service message transmitting unit 212e of the transmit/receive controller 212.

3-2-5. Derails of Simulator Core

In the simulator core 242, the overall path planning unit 242a acquires sensor information from the sensor information generating unit 222b of the 3D physical engine 222. The overall path planning unit 242a acquires the operation instruction information and the other service system information from the path planning information receiving unit 232a of the service system client simulator 232. The overall path planning unit 242a plans the overall path of the ego-agent in the virtual world 2 based on the acquired information. The overall path refers to the path from the current location of the ego-agent to the target point. Since the information acquired from the sensor information generating unit 222b and the path planning information receiving unit 232a changes every time, the overall path planning unit 242a determines an overall path plan for each time step. The overall path planning unit 242a outputs the determined overall path plan to the local path planning unit 242b.

The local path planning unit 242b acquires the overall path plan from the overall path planning unit 242a. The local path planning unit 242b determines a local path plan based on the overall path plan. The local path means, for example, a path from the current time point to a time point after a predetermined time step, or a path from the current position to a position separated by a predetermined distance. A local path plan is represented, for example, by a set of locations to be traversed by the ego-agent and a speed or acceleration at each location. The local path planning unit 242b outputs the determined local path plan to the actuator operation amount determining unit 242c.

The actuator operation amount determining unit 242c acquires the local path plan from the local path planning unit 242b. The actuator operation amount determining unit 242c determines actuator operation amounts of the ego-agent in the next time step based on the local path plan. The actuators here include actuators that control the direction, speed, and acceleration of the ego-agent. When the ego-agent is an autonomous robot/vehicle traveling on wheels, for example, actuators such as a braking device, a driving device, and a steering device are operated. The actuator operation amount determining unit 242c outputs the determined actuator operation amounts to the next time step state calculating unit 242d and the operation state information generating unit 232b of the service system client simulator 232.

The next time step state calculating unit 242d acquires the actuator operation amounts determined by the actuator operation amount determining unit 242c. The next time step state calculating unit 242d calculates the state of the ego-agent in the next time step based on the actuator operation amounts. The calculated state of the ego-agent includes the location, direction, speed, and acceleration of the ego-agent in the next time step. The next time step state calculating unit 242d outputs the calculated state of the ego-agent in the next time step to the ego-agent state updating unit 222c of the 3D physical engine 222. The next time step state calculating unit 242d outputs the start time of calculation for updating the state of the ego-agent to the remainder time rate calculating unit 212g of the transmit/receive controller 212.

3-3. Agent Simulator for VR Pedestrian Agent

Figure 6:
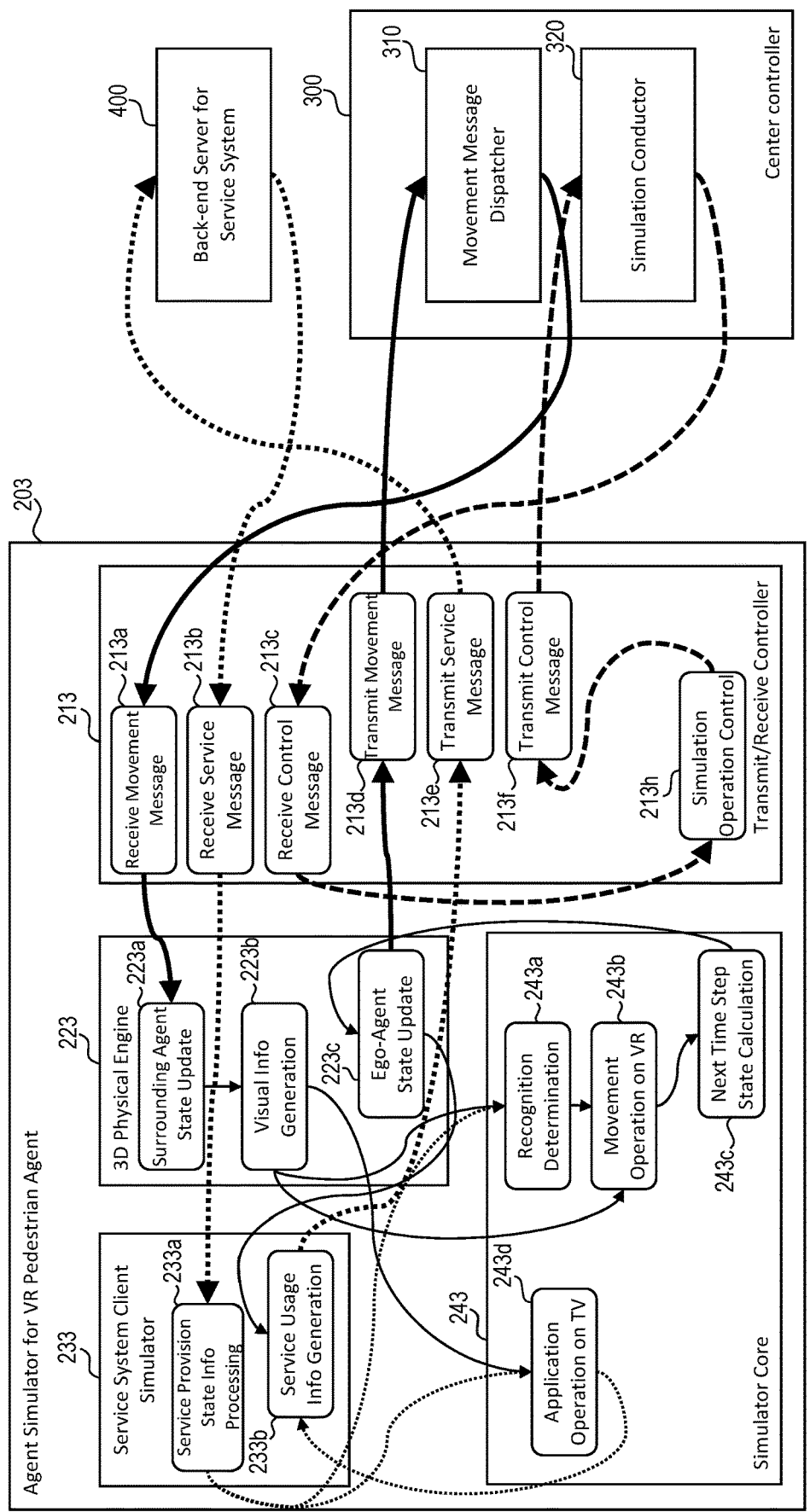
FIG. 6 is a block diagram illustrating a configuration and flows of information of an agent simulator for a VR pedestrian agent according to the embodiment of the present disclosure.

FIG. 6 is a block diagram illustrating a configuration and a flow of information of an agent simulator 203 for a VR pedestrian agent. The VR pedestrian agent is a pedestrian agent for a real person to participate in the virtual world 2 which is the target of simulation by using the VR (Virtual Reality) system. Hereinafter, the overall configuration of the agent simulator 203 for the VR pedestrian agent, the details of each part, and the flow of information in the agent simulator 203 will be described below.

3-3-1. Overall Configuration of Agent Simulator for VR Pedestrian Agent

The agent simulator 203 includes, as its function, a transmit/receive controller 213, a 3D physical engine 223, a service system client simulator 233, and a simulator core 243. These functions are conceptually included in the transmit/receive controller 210, the 3D physical engine 220, the service system client simulator 230, and the simulator core 240, respectively.

The transmit/receive controller 213 includes a movement message receiving unit 213a, a service message receiving unit 213b, and a control message receiving unit 213c as functions for receiving various messages. The transmit/receive controller 213 includes a movement message transmitting unit 213d, a service message transmitting unit 213e, and a control message transmitting unit 213f as functions for transmitting various messages. The transmit/receive controller 213 further includes a simulation operation controlling unit 213h. Each of the units 213a to 213f and 213h comprising the transmit/receive controller 213 is a program or a part of a program. It should be noted that the description in each block describes a representative function of each unit and does not necessarily coincide with the name of each unit.

The 3D physical engine 223 includes, as its functions, a surrounding agent state updating unit 223a, a visual information generating unit 223b, and an ego-agent state updating unit 223c. Each of the units 223a, 223b, 223c comprising the 3D physical engine 223 is a program or a part of a program. It should be noted that the description in each block describes a representative function of each unit and does not necessarily coincide with the name of each unit.

The service system client simulator 233 includes, as its functions, a service provision state information processing unit 233a and a service usage information generating unit 233b. Each of the units 233a and 233b comprising the service system client simulator 231 is a program or a part of a program. It should be noted that the description in each block describes a representative function of each unit and does not necessarily coincide with the name of each unit.

The simulator core 243 includes, as its functions, a recognition determination information presenting unit 243a, a movement operation accepting unit 243b, a next time step state calculating unit 243c, and an application operation accepting unit 243 d. Each of the units 243a, 243b, 243c, 243d comprising the simulator core 243 is a program or a part of a program. It should be noted that the description in each block describes a representative function of each unit and does not necessarily coincide with the name of each unit.

3-3-2. Details of Transmit/Receive Controller

In the transmit/receive controller 213, the movement message receiving unit 213a receives a movement message from the movement message dispatcher 310. The movement message receiving unit 213a outputs the received movement message to the surrounding agent state updating unit 223a of the 3D physical engine 223.

The service message receiving unit 213b receives a service message from the back-end server 400. The service message receiving unit 213b outputs the received service message to the service provision state information processing unit 233a of the service system client simulator 233.

The control message receiving unit 213c receives a simulation control message from the simulation conductor 320. The control message receiving unit 213c outputs the received simulation control message to the simulation operation controlling unit 213h.

The movement message transmitting unit 213d acquires a movement message including the current state of the ego-agent from the ego-agent state updating unit 223c of the 3D physical engine 223. The movement message transmitting unit 213d transmits the acquired movement message to the movement message dispatcher 310.

The service message transmitting unit 213e acquires a service message including service usage information from the service usage information generating unit 233b of the service system client simulator 233. The service message transmitting unit 213e transmits the acquired service message to the back-end server 400.

The control message transmitting unit 213f acquires a simulation control message including the control state of the agent simulator 203 from the simulation operation controlling unit 213h. The control message transmitting unit 213f transmits the simulation control message acquired from the simulation operation controlling unit 213h to the simulation conductor 320.

The simulation operation controlling unit 213h acquires a simulation control message from the control message receiving unit 213c. The simulation operation controlling unit 213h controls the simulation operation of the agent simulator 203 in accordance with an instruction included in the simulation control message. When the VR pedestrian agent does not satisfy the participation condition in the virtual world 2, the simulation conductor 320 instructs the agent simulator 203 to stop the simulation.

The agent simulators 201,202 described above and the agent simulator 204 described later can change the simulation speed as needed. However, if the simulation speed is changed, a real-world participant participating in the virtual world 2 through the VR pedestrian agent may feel a strong discomfort against the flow of time different from the real world. Therefore, in the MAS system 100, participation of the VR pedestrian agent to the virtual world 2 is allowed on the condition that the simulation is being performed in real time. When the simulation speed is accelerated or decelerated more than the flow of time in the real world, the simulation conductor 320 stops the simulation by the agent simulator 203. The simulation operation controlling unit 213h outputs a simulation control message including the current control state of the agent simulator 203 to the control message transmitting unit 213f.

3-3-3. Details of 3D Physical Engine

In the 3D physical engine 223, the surrounding agent state updating unit 223a acquires a movement message from the movement message receiving unit 213a. The movement message acquired from the movement message receiving unit 213a is a movement message transmitted from another agent simulator via the movement message dispatcher 310. The surrounding agent state updating unit 223a estimates the current state of a surrounding agent existing around the ego-agent based on the acquired movement message.

When the current state of the surrounding agent is estimated from the past state, the surrounding agent state updating unit 223a uses the past state of the surrounding agent stored in the log. The method of estimating the current state using the past state of the surrounding agent is described using FIG. 3. The surrounding agent state updating unit 223a outputs the estimated current state of the surrounding agent to the visual information generating unit 223b and updates the log.

The visual information generating unit 223b acquires the current state of the surrounding agent from the surrounding agent state updating unit 223a. The visual information generating unit 223b generates peripheral information obtained by observation from the ego-agent based on the current state of the surrounding agent. Since the ego-agent is a pedestrian, peripheral information obtained by observation means visual information captured by the pedestrian's eyes. The visual information generating unit 223b outputs the generated visual information to the recognition determination information presenting unit 243a and the movement operation accepting unit 243b of the simulator core 243.

The ego-agent state updating unit 223c acquires the state of the ego-agent in the next time step calculated by the simulator core 243 from the next time step state calculating unit 243c of the simulator core 243. The ego-agent state updating unit 223c updates the state of the ego-agent in the three-dimensional space based on the calculation result by the simulator core 243. The ego-agent state updating unit 223c outputs a movement message including the updated state of the ego-agent to the movement message transmitting unit 213d of the transmit/receive controller 213. The state of the ego-agent included in the movement message includes the location, direction, speed, acceleration in the current time step, and the location, direction, speed, and acceleration in the next time step. In addition, the ego-agent state updating unit 223c outputs information on the updated state of the ego-agent to the service usage information generating unit 233b of the service system client simulator 233.

3-3-4. Details of Service System Client Simulator

In the service system client simulator 233, the service provision state information processing unit 233a acquires a service message from the service message receiving unit 213b. The service message acquired from the service message receiving unit 213b includes service provision state information. The service provision state information processing unit 233a processes the service provision state information, and acquires information on the state of the ego-agent as a user of the service system and input items to the service application of the user terminal. The information on the state of the ego-agent as a user is information presented to the user terminal, and the input items are information requested to input in order for the ego-agent to use the service. The service provision state information processing unit 233a outputs the information on the state of the ego-agent as a user and the input items to the service application of the user terminal to the recognition determination information presenting unit 243a and the application operation accepting unit 243 d of the simulator core 243.

The service usage information generating unit 233b acquires the operation of the service application on the VR by a real participant participating in the virtual world 2 via the VR pedestrian agent from the application operation accepting unit 243 d of the simulator core 243. In addition, the service usage information generating unit 233b acquires the state of the ego-agent in the three-dimensional space from the ego-agent state updating unit 223c of the 3D physical engine 223. The service usage information generating unit 233b generates service usage information based on the acquired information and updates the usage state of the service of the ego-agent. The service usage information generating unit 233b outputs a service message including the service usage information to the service message transmitting unit 213e of the transmit/receive controller 213.

3-3-5. Details of Simulator Core

In the simulator core 243, the recognition determination information presenting unit 243a acquires visual information from the visual information generating unit 223b of the 3D physical engine 223. In addition, the recognition determination information presenting unit 243a acquires the information on the state of the ego-agent as a user and the input items to the service application of the user terminal from the service provision state information processing unit 233a of the service system client simulator 231. The acquired information is information for recognition determination for the real participant participating in the virtual world 2 through the VR pedestrian agent. The recognition determination information presenting unit 243a presents the recognition determination information to the real participant through the VR system.

The movement operation accepting unit 243b acquires visual information from the visual information generating unit 223b of the 3D physical engine 223. The movement operation accepting unit 243b accepts a movement operation on the VR by the real participant while presenting the visual information to the real participant through the VR system. The movement operation accepting unit 243b outputs the accepted movement operation on the VR by the real participant to the next time step state calculating unit 243d.

The next time step state calculating unit 243d acquires the movement operation on the VR by the real participant from the movement operation accepting unit 243b. The next time step state calculating unit 243d calculates the state of the ego-agent in the next time step based on the movement operation on the VR by the real participant. The calculated state of the ego-agent includes the location, direction, speed, and acceleration of the ego-agent in the next time step. The next time step state calculating unit 243d outputs the calculated state of the ego-agent in the next time step to the ego-agent state updating unit 223c of the 3D physical engine 223.

The application operation accepting unit 243 d acquires visual information from the visual information generating unit 223b of the 3D physical engine 223. In addition, the application operation accepting unit 243 d acquires the information on the state of the ego-agent as a user and the input items to the service application of the user terminal from the service provision state information processing unit 233a of the service system client simulator 233. The application operation accepting unit 243 d accepts the operation of the service application on the VR by the real participant while presenting the acquired information to the real participant through the VR system. The application operation accepting unit 243 d outputs the accepted operation of the service application on the VR by the real participant to the service usage information generating unit 233b of the service system client simulator 233.

3-4. Agent Simulator for Roadside Sensor Agent

Figure 7:
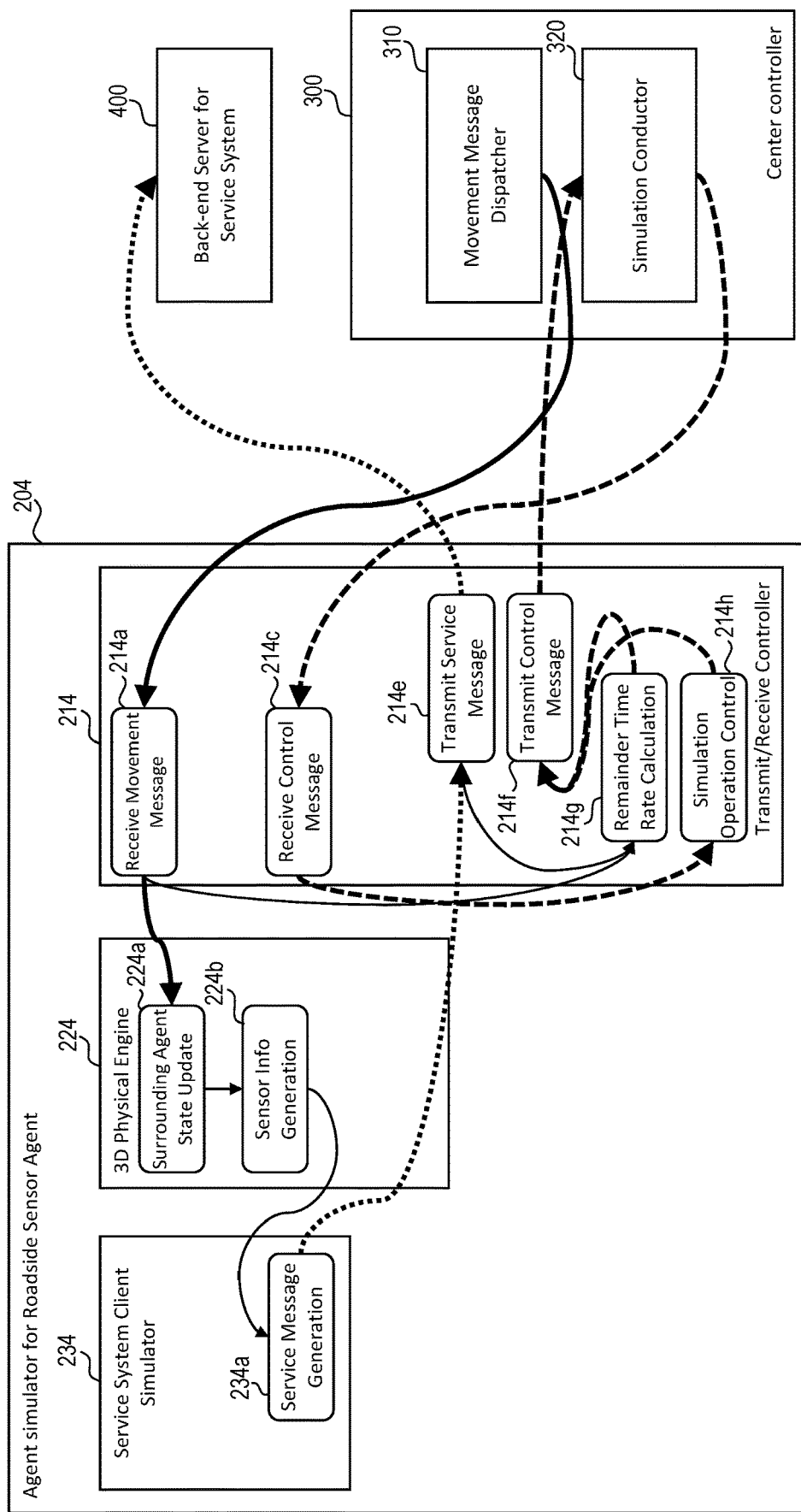
FIG. 7 is a block diagram illustrating a configuration and flows of information of an agent simulator for a roadside sensor agent according to the embodiment of the present disclosure.

FIG. 7 is a block diagram illustrating the configuration and a flow of information of an agent simulator 204 for a roadside sensor agent. The roadside sensor agent is an agent of a roadside sensor used for acquisition of location information of an autonomous robot/vehicle agent in the virtual world 2. The location information of the autonomous robot/vehicle agent acquired by the roadside sensor agent is used in the service system associated with the back-end server 400. Hereinafter, the overall configuration of the agent simulator 204 for the roadside sensor agent, the details of each part, and the flow of information in the agent simulator 204 will be described.

3-4-1. Overall Configuration of Agent Simulator for Roadside Sensor Agent

The agent simulator 204 includes, as its function, a transmit/receive controller 214, a 3D physical engine 224, and a service system client simulator 234. These functions are conceptually included in the transmit/receive controllers 210, 3D physical engine 220, and the simulator core 240, respectively. The agent simulator 204 does not have a simulator core unlike other agent simulators.

The transmit/receive controller 214 includes a movement message receiving unit 214a and a control message receiving unit 214b as functions for receiving various messages. The transmit/receive controller 214 includes a service message transmitting unit 214e and a control message transmitting unit 214f as functions for transmitting various messages. The transmit/receive controller 214 further includes a remainder time rate calculating unit 214g and a simulation operation controlling unit 214h. Each of the units 214a, 214c and 214e to 214h comprising the transmit/receive controller 214 is a program or a part of a program. It should be noted that the description in each block describes a representative function of each unit and does not necessarily coincide with the name of each unit.

The 3D physical engine 224 includes, as its function, a surrounding agent state updating unit 224a and a sensor information generating unit 224b. Each of the units 224a, 224b comprising the 3D physical engine 224 is a program or a part of a program. It should be noted that the description in each block describes a representative function of each unit and does not necessarily coincide with the name of each unit.

The service system client simulator 234 includes a service message generating unit 234a as a function thereof. The service message generator 234a comprising the service system client simulator 234 is a program or a part of a program. It should be noted that the description in each block describes a representative function of each unit and does not necessarily coincide with the name of each unit.

3-4-2. Details of Transmit/Receive Controller

In the transmit/receive controller 214, the movement message receiving unit 214a receives a movement message from the movement message dispatcher 310. The movement message receiving unit 214a outputs the received movement message to the surrounding agent state updating unit 224a of the 3D physical engine 224. In addition, the movement message receiving unit 214a outputs information including the time at which the movement message is received to the remainder time rate calculating unit 214g.

The control message receiving unit 214c receives a simulation control message from the simulation conductor 320. The control message receiving unit 214c outputs the received simulation control message to the simulation operation controlling unit 214h.

The service message transmitting unit 214e acquires a service message including sensor information from the service message generating unit 234a of the service system client simulator 234. The service message transmitting unit 214e transmits the acquired service message to the back-end server 400.

The control message transmitting unit 214f acquires a simulation control message including information on the speed state of the simulation from the remainder time rate calculating unit 214g. Also, the control message transmitting unit 214f acquires a simulation control message including the control state of the agent simulator 204 from the simulation operation controlling unit 214h. The control message transmitting unit 214f transmits the simulation control messages acquired from the remainder time rate calculating unit 214g and the simulation operation controlling unit 214h to the simulation conductor 320.

The remainder time rate calculating unit 214g acquires information including the reception time of the movement message from the movement message receiving unit 214a. The remainder time rate calculating unit 214g acquires information including the transmission completion time of the service message from the service message transmitting unit 214e. The remainder time rate calculating unit 214g calculates the remainder time, the remainder time rate, and the delay time based on the acquired information by the above-described equations. However, in the calculation of the residual time and the residual time rate, the calculated value calculated from the operating frequency of the agent simulator 204 is used for Ta (N+1) and Ta (N). In addition, the transmission completion time of the service message is used in place of the transmission completion time of the movement message in the current time step in Td(N).

The remainder time rate calculating unit 214g outputs a simulation control message including the remainder time, the remainder time rate, and the delay time to the control message transmitting unit 214f. Upon receiving the simulation control message including the above information, the simulation conductor 320 creates a simulation control message including the control contents to be instructed to the agent simulator 204, and transmits the simulation control message to the agent simulator 204.

The simulation operation controlling unit 214h acquires a simulation control message from the control message receiving unit 214c. The simulation operation controlling unit 214h controls the simulation operation of the agent simulator 204 in accordance with an instruction included in the simulation control message. For example, when the change of the time granularity of the simulation is instructed, the simulation operation controlling unit 214h changes the time granularity of the simulation by the agent simulator 204 from the initial value to the instructed time granularity. The initial value of the time granularity is stored as a set value in the agent simulator 204. The upper and lower limit values of the time granularity are stored in the simulation conductor 320 for each type of agent.

When the instruction content of the simulation control message is the simulation speed, the simulation operation controlling unit 214h changes the operating frequency of the 3D physical engine 224 in accordance with the instructed simulation speed, and accelerates or decelerates the operation speed of the agent simulator 204. When the stop of the simulation is instructed, the simulation operation controlling unit 214h stops the simulation by the agent simulator 204. When the stop of the simulation is instructed, the simulation operation controlling unit 214h stops the simulation. When the restart of the simulation is instructed, the simulation operation controlling unit 214h restarts the simulation. The simulation operation controlling unit 214h outputs a simulation control message including the current control state of the agent simulator 204 to the control message transmitting unit 214f.

3-4-3. Details of 3D Physical Engine

In the 3D physical engine 224, the surrounding agent state updating unit 224a acquires a movement message from the movement message receiving unit 214a. The movement message acquired from the movement message receiving unit 214a is a movement message transmitted from another agent simulator via the movement message dispatcher 310. The surrounding agent state updating unit 224a estimates the current state of a surrounding agent existing around the ego-agent based on the acquired movement message.

When the current state of the surrounding agent is estimated from the past state, the surrounding agent state updating unit 224a uses the past state of the surrounding agent stored in the log. The method of estimating the current state using the past state of the surrounding agent is described using FIG. 3. The surrounding agent state updating unit 224a outputs the estimated current state of the surrounding agent to the sensor information generating unit 224b and updates the log.

The sensor information generating unit 224b acquires the current state of the surrounding agent from the surrounding agent state updating unit 224a. The sensor information generating unit 224b generates peripheral information obtained by observation from the ego-agent based on the current state of the surrounding agent. Since the ego-agent is a non-moving roadside sensor like a camera, peripheral information obtained by observation means sensor information captured by the roadside sensor. The sensor information generating unit 224b outputs the generated sensor information to the service message generating unit 234a of the service system client simulator 234.

3-4-4. Details of Service System Client Simulator

In the service system client simulator 234, the service message generator 234a acquires sensor information from the sensor information generator 224b of the 3D physical engine 224. The service message generating unit 234a outputs a service message including the acquired sensor information to the service message transmitting unit 214e of the transmit/receive controller 214.

4. Aggregation and Evaluation of Simulation Results by MAS System

Figure 8:
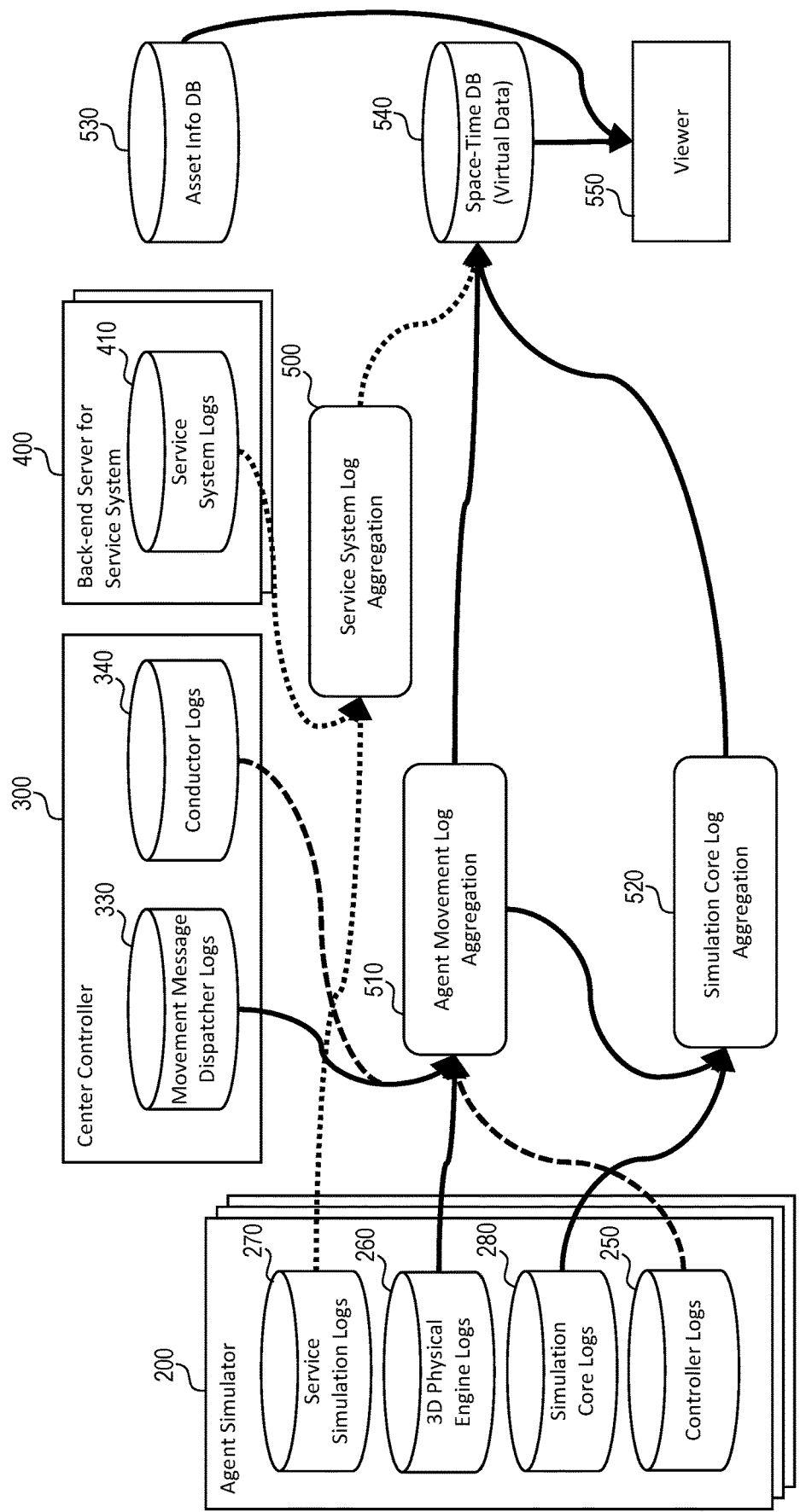
FIG. 8 is a block diagram illustrating a configuration for aggregation and evaluation of simulation results by the multi-agent simulation system according to the embodiment of the present disclosure.

By performing the simulation with the MAS system 100, various data about the target world of the simulation can be obtained. FIG. 8 shows a configuration for aggregating and evaluating simulation results by the MAS system 100.

The MAS system 100 provides a data logger at each location for storing a log of the simulated data. The agent simulator 200 is provided with a data logger 250, 260, 270, 280. The data logger 250 stores data logs in the transmit/receive controller 210 (controller logs). The data logger 260 stores data logs in the 3D physical engine 220 (3D physical engine logs). The data logger 270 stores data logs in the service system client simulator 230 (service simulation logs). The data logger 280 stores data logs in the simulator core 240 (simulation core logs).

The center controller 300 is provided with a data logger 330, 340. The data logger 330 stores data logs in the movement message dispatcher 310 (movement message dispatcher logs). The data logger 340 stores data logs in the simulation conductor 320 (conductor logs).

The back-end server 400 is provided with a data logger 410. The data logger 410 stores data logs in the back-end server 400 (service system logs).

The MAS system 100 includes a service system log aggregating unit 500, an agent movement log aggregating unit 510, a simulation core log aggregating unit 520, an asset information database 530, a space-time database 540, and a viewer 550. They are installed on a computer for evaluation of simulation results.

The service system log aggregating unit 500 collects data logs from the data logger 270, 410. These data logs collected in the service system log aggregating unit 500 are data logs related to the service system. From these data logs, it is possible to evaluate whether the service was properly provided. It is also possible to evaluate the points of interest in providing services, including the utilization rate of service resources such as logistics robots.

The agent movement log aggregating unit 510 collects data logs from the data logger 250, 260, 330, 340. These data logs collected in the agent movement log aggregating unit 510 are data logs related to agent movement. From these data logs, the correct operation of the agent can be confirmed. It is also possible to check for problems such as overlapping agents. When an error occurs during the simulation, the time range in which the simulation content is assumed to be valid can be output from the data logs.

The simulation core log aggregating unit 520 collects data logs from the data logger 280 and the agent movement log aggregating unit 510. These data logs collected in the simulation core log aggregating unit 520 are data logs related to the points of interest in the simulation. From these data logs, it is possible to evaluate the points of interest such as the density of a person if the simulation is about a pedestrian, and the internal judgment result if the simulation is about a robot.

The asset information database 530 stores BIM/CIM data or three-dimensional information of a fixed object such as a building converted from BIM/CIM data and stores three-dimensional information of each agent.

The space-time database 540 stores virtual data for simulation. The evaluation results based on the data logs aggregated by the service system log aggregating unit 500, the agent movement log aggregating unit 510, and the simulation core log aggregating unit 520 are reflected to the virtual data in the space-time database 540.

The viewer 550 displays the virtual world 2 on the monitor using the three-dimensional information of the fixed object and the agent stored in the asset information database 530 and the virtual data stored in the space-time database 540.

5. Physical Configuration of MAS System

Figure 9:
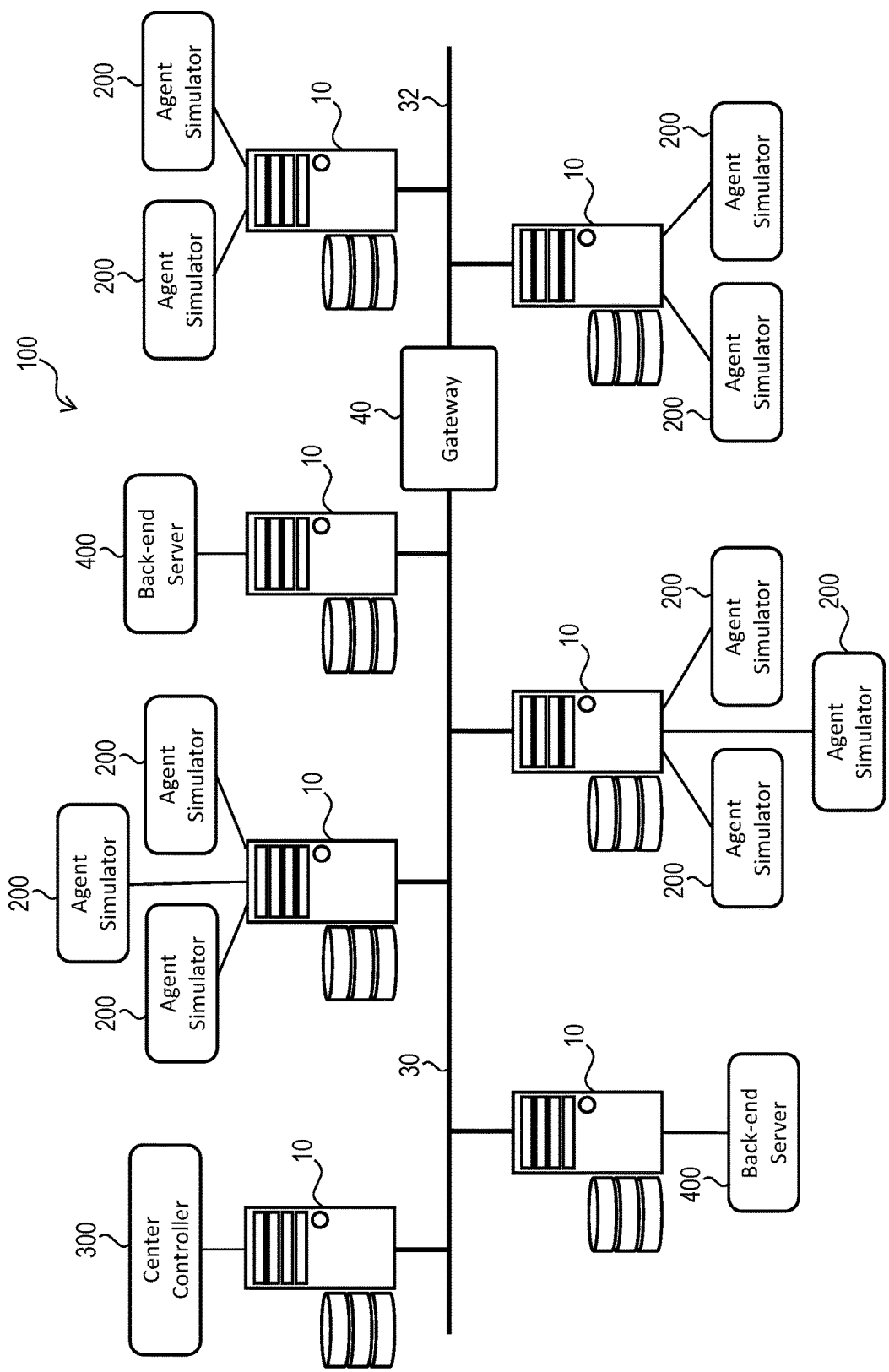
FIG. 9 is a diagram illustrating an example of a physical configuration of the multi-agent simulation system according to the embodiment of the present disclosure.

The physical configuration of the MAS system 100 will be described. FIG. 9 is a diagram illustrating an example of a physical configuration of the MAS system 100. The MAS system 100 may comprise, for example, a plurality of computers 10 arranged on the same subnet 30. Further, by connecting the subnet 30 and another subnet 32 by a gateway 40, the MAS system 100 can be expanded to a plurality of computers 10 located on the subnet 32.

In the example shown in FIG. 9, the center controller 300, which is software, is installed on one computer 10. However, the functions of the center controller 300 may be distributed to a plurality of computers 10.

The MAS system 100 includes a plurality of back-end servers 400. In the example shown in FIG. 9, each back-end server 400 is installed on a separate computer 10. However, the function of the back-end server 400 may be distributed to a plurality of computers 10. Further, a plurality of back-end servers 400 may be installed on one computer 10 by a virtualization technique for dividing one server into a plurality of servers.

In the example shown in FIG. 9, a plurality of agent simulators 200 are installed on one computer 10. Virtualization technology can be used as a method of independently operating a plurality of agent simulators 200 on a single computer 10. The virtualization technology can be a virtual machine or a container virtualization. A plurality of agent simulators 200 of the same type may be installed on one computer 10, or a plurality of agent simulators 200 of different types may be installed. Note that only one agent simulator 200 may be installed on one computer 10.

As described above, the MAS system 100 employs parallel distributed processing using a plurality of computers 10 rather than processing by a single computer. This prevents the computing power from limiting the number of agents appearing in the virtual world 2 and the computing power from limiting the number of services provided in the virtual world 2. That is, according to the MAS system 100, a large-scale simulation by parallel distributed processing is possible.

7. Other Embodiment

An observation agent may be provided to observe the virtual world 2 from outside. The observation agent may be, for example, a non-moving object, such as a street-corner camera, or a moving object, such as a drone with a camera.

What is claimed is:

1. A system for simulating a target world using a plurality of agents interacting with each other, comprising:
   a plurality of back-end servers installed on at least one computer and provided for each of a plurality of service systems, the each of a plurality of service systems providing a service used in the target world;
   a plurality of agent simulators provided for each of the plurality of agents and configured to simulate a state of each of the plurality of agents while causing the plurality of simulated agents to interact with each other by exchange of first messages, wherein each agent simulator comprises application software installed on a computer;
   the plurality of back-end servers and the plurality of agent simulators being configured to simultaneously simulate a plurality of services by exchanging second messages different from the first messages, wherein:
   the plurality of agents include:
   a plurality of first agents using the plurality of services; and
   a plurality of second agents used to provide the plurality of services, the plurality of agent simulators include:
a plurality of first agent simulators provided for each of the plurality of first agents and configured to simulate a state of each of the plurality of first agents; and
a plurality of second agent simulators provided for each of the plurality of second agents and configured to simulate a state of each of the plurality of second agents,
the second messages include:
a message transmitted from each of the plurality of first agent simulators and including information on a use state of service by each of the plurality of first agents;
a message transmitted from each of the plurality of back-end servers and including information on a provision state of service to each of the plurality of first agents;
a message transmitted from each of the plurality of second agent simulators and including information on an operation state of each of the plurality of second agents; and
a message transmitted from each of the plurality of back-end servers and including information on an operation instruction to each of the plurality of second agents;
further comprising a center controller installed on a computer and configured to communicate with the plurality of agent simulators to control transmission and reception of the first messages between the plurality of agent simulators,
wherein the plurality of agent simulators are configured to exchange the first messages between the plurality of agent simulators via the center controller and exchange the second messages with the plurality of back-end servers directly without going through the center controller.

2. The system according to claim 1, wherein each of the plurality of first agent simulators comprises a client simulator configured to simulate a behavior of a first agent as a client of the plurality of services.

3. The system according to claim 1, wherein the plurality of back-end servers are configured to exchange messages for linking the plurality of services.

4. A method for simulating a target world using a plurality of agents interacting with each other, comprising:
exchanging first messages between a plurality of agent simulators provided for each of the plurality of agents;
simulating a state of each of the plurality of agents while causing the plurality of agents to interact with each other by exchange of the first messages;
exchanging second messages different from the first messages between the plurality of agent simulators and a plurality of back-end servers provided for each of a plurality of service systems, the each of a plurality of service systems providing a service used in the target world;
simultaneously simulating a plurality of services by exchange of the second messages,
wherein:
the plurality of agents include:
a plurality of first agents using the plurality of services; and
a plurality of second agents used to provide the plurality of services,
the plurality of agent simulators include:
a plurality of first agent simulators provided for each of the plurality of first agents and configured to simulate a state of each of the plurality of first agents; and
a plurality of second agent simulators provided for each of the plurality of second agents and configured to simulate a state of each of the plurality of second agents,
the second messages include:
a message transmitted from each of the plurality of first agent simulators and including information on a use state of service by each of the plurality of first agents;
a message transmitted from each of the plurality of back-end servers and including information on a provision state of service to each of the plurality of first agents;
a message transmitted from each of the plurality of second agent simulators and including information on an operation state of each of the plurality of second agents; and
a message transmitted from each of the plurality of back-end servers and including information on an operation instruction to each of the plurality of second agents;
wherein:
the exchanging the first messages includes exchanging the first messages between the plurality of agent simulators via a center controller configured to communicate with the plurality of agent simulators; and
the exchanging the second messages includes exchanging the second messages between the plurality of agent simulators and the plurality of back-end servers directly without going through the center controller.

5. The method according to claim 4, further comprising simulating a behavior of a first agent as a client of the plurality of services by a client simulator provided for each of the plurality of first agent simulators.

6. The method according to claim 4, further comprising exchanging messages for linking the plurality of services by the plurality of back-end servers.

* * * * *